(12) United States Patent
You et al.

(10) Patent No.: US 8,941,799 B2
(45) Date of Patent: Jan. 27, 2015

(54) LIQUID CRYSTAL DISPLAY

(71) Applicant: Samsung Display Co., Ltd., Yongin (KR)

(72) Inventors: Jae Ho You, Gwangmyeong-si (KR); Hyun Jin Cho, Seoul (KR); Dae Ho Yoon, Pohang-si (KR); Moon Gyu Lee, Suwon-si (KR); Byoung Ho Cheong, Yongin-si (KR)

(73) Assignee: Samsung Display Co., Ltd. (KR)

( * ) Notice: Subject to any disclaimer, the term of this patent is extended or adjusted under 35 U.S.C. 154(b) by 123 days.

(21) Appl. No.: 13/844,372

(22) Filed: Mar. 15, 2013

(65) Prior Publication Data

US 2014/0049724 A1    Feb. 20, 2014

(30) Foreign Application Priority Data

Aug. 14, 2012  (KR) .......................... 10-2012-0088891

(51) Int. Cl.
   *G02F 1/1335*  (2006.01)

(52) U.S. Cl.
   CPC .... *G02F 1/133553* (2013.01); *G02F 1/133512* (2013.01); *G02F 1/1336* (2013.01); *G02F 1/133514* (2013.01); *G02F 2202/36* (2013.01); *G02F 2203/30* (2013.01)
   USPC ............................ 349/104; 349/105; 349/106

(58) Field of Classification Search
   CPC .......................................... G02F 2001/133314
   USPC ........... 349/98, 104, 105, 106, 107, 108, 109, 349/113, 114, 115
   See application file for complete search history.

(56) References Cited

U.S. PATENT DOCUMENTS 7,262,758 B2    8/2007  Kahen et al.
7,728,922 B2 *  6/2010  Hirota et al. .................... 349/62

(Continued)

FOREIGN PATENT DOCUMENTS

KR    10-2007-0072203    7/2007
KR    10-2008-0001963    1/2008

(Continued)

OTHER PUBLICATIONS

Dorjgotov et al. "Switchable polarization-independent liquid-crystal Fabry-Perot filter." Applied Optics vol. 48, No. 1, Jan. 2009.

(Continued)

*Primary Examiner* — James Dudek
(74) *Attorney, Agent, or Firm* — Innovation Counsel LLP

(57) ABSTRACT

Provided is a liquid crystal display including: a lower display panel including a lower insulating substrate and a lower reflective layer; an upper display panel including an upper insulating substrate and an upper reflective layer; a liquid crystal layer positioned between the lower reflective layer of the lower display panel and the upper reflective layer of the upper display panel; and a backlight unit positioned on a lower portion of the lower display panel and including a light source, wherein a pair of field generating electrodes are formed in at least one display panel of the lower display panel and the upper display panel, wherein microcavities are formed in the lower reflective layer, the upper reflective layer, and the liquid crystal layer, and wherein a wavelength and luminance of light resonated and emitted in the microcavities are changed by an electric field generated by the field generating electrodes.

20 Claims, 18 Drawing Sheets

(56) References Cited

U.S. PATENT DOCUMENTS

| | | |
|---|---|---|
| 7,884,374 B2 | 2/2011 | Toyama et al. |
| 7,884,532 B2 | 2/2011 | Lee et al. |
| 7,982,812 B2 | 7/2011 | Rho et al. |
| 8,184,216 B2 * | 5/2012 | Lee .................................. 349/15 |
| 2009/0322971 A1 | 12/2009 | Dorjgotov et al. |
| 2010/0220262 A1 | 9/2010 | Demille et al. |
| 2011/0089809 A1 | 4/2011 | Noh |
| 2011/0170042 A1 | 7/2011 | Cho et al. |
| 2013/0021556 A1 * | 1/2013 | Nagato et al. ................... 349/62 |

FOREIGN PATENT DOCUMENTS

| | | |
|---|---|---|
| KR | 10-2011-0037195 | 4/2011 |
| KR | 10-1098783 | 12/2011 |
| KR | 10-2012-0036053 | 4/2012 |

OTHER PUBLICATIONS

Yata et al. "Emissive LCD panels consisting of near-UV LED and RGB patterned phosphors." IEICE Technical Report, 2010.

* cited by examiner

LIQUID CRYSTAL DISPLAY

CROSS-REFERENCE TO RELATED APPLICATION

This application claims priority to and the benefit of Korean Patent Application No. 10-2012-0088891 filed in the Korean Intellectual Property Office on Aug. 14, 2012, the entire contents of which are incorporated herein by reference.

BACKGROUND (a) Technical Field

The present invention relates to a liquid crystal display.

(b) Description of the Related Art

A liquid crystal display is one of the most common types of flat panel displays currently in use, and includes two display panels in which field generating electrodes such as a pixel electrode and a common electrode are formed, and a liquid crystal layer interposed therebetween.

The liquid crystal display displays an image by applying a voltage to the field generating electrode to generate an electric field on the liquid crystal layer, determining alignment of liquid crystal molecules of the liquid crystal layer through the generated electric field, and controlling polarization of incident light. Generally, in the liquid crystal display, a color filter is used to display a color, and a polarizer is used to transmit or to block light from a backlight unit. The color filter and the polarizer used as described above reduce transmittance of light that is incident on the liquid crystal display. That is, the color filter reduces the transmittance by about ⅓, and the polarizer reduces the transmittance by ½ or more.

Therefore, there is a drawback in that a backlight needs to be capable of emitting light having an even higher level in order to allow the liquid crystal display to display a desired luminance level.

The above information disclosed in this Background section is only for enhancement of understanding of the background of the invention and therefore it may contain information that does not form the prior art that is already known in this country to a person of ordinary skill in the art.

SUMMARY

Embodiments of the present invention has been made in an effort to provide a display device that does not adopt a color filter and a polarizer to enhance transmittance.

An exemplary embodiment of the present invention provides a liquid crystal display including: a lower display panel including a lower insulating substrate and a lower reflective layer; an upper display panel including an upper insulating substrate and an upper reflective layer; a liquid crystal layer positioned between the lower reflective layer of the lower display panel and the upper reflective layer of the upper display panel; and a backlight unit positioned on a lower portion of the lower display panel and including a light source, wherein a pair of field generating electrodes are formed in at least one display panel of the lower display panel and the upper display panel, wherein microcavities are formed in the lower reflective layer, the upper reflective layer, and the liquid crystal layer, and wherein a wavelength or luminance of light resonated and emitted in the microcavities is changed by an electric field generated by the field generating electrodes.

A gray may be displayed by adjusting a voltage applied to the field generating electrodes to change the electric field, and thus changing the luminance of light emitted in the microcavities.

The upper reflective layer and the lower reflective layer may include a unit laminate structure where a high refractive index layer and a low refractive index layer are repeatedly laminated.

The unit laminate structure may have a triple layer structure where two upper and lower high refractive index layers are formed and the low refractive index layer is positioned therebetween.

One of the upper reflective layer and the lower reflective layer comprises at least two unit laminate structure and a metal layer interposed therebetween.

The upper display panel may further include a fluorescent body unit including a fluorescent layer.

The fluorescent layer may be excited by light having a predetermined wavelength provided from the light source to display a color.

The fluorescent body unit may further include a light transmission layer positioned under the fluorescent layer and allowing light having the predetermined wavelength to be transmitted therethrough.

The fluorescent body unit may further include a light blocking layer positioned on the fluorescent layer and blocking light having the predetermined wavelength.

The fluorescent body unit may be positioned between the upper insulating substrate and the upper reflective layer.

The fluorescent body unit may be positioned at an external side of the upper insulating substrate.

The field generating electrodes may include the common electrode formed in the upper display panel and the pixel electrode formed in the lower display panel, the common electrode may be positioned on the upper reflective layer, and the pixel electrode may be positioned under the lower reflective layer.

The field generating electrodes may include the common electrode formed in the upper display panel and the pixel electrode formed in the lower display panel, the common electrode may be positioned under the upper reflective layer, and the pixel electrode may be positioned on the lower reflective layer.

The lower display panel may further include a second lower reflective layer positioned on a lower portion of the lower reflective layer, and the upper display panel may further include a second upper reflective layer positioned on an upper portion of the upper reflective layer.

The liquid crystal display may further include a lower dielectric layer positioned between the lower reflective layer and the second lower reflective layer, and an upper dielectric layer positioned between the upper reflective layer and the second upper reflective layer.

The liquid crystal display may further include an optical film attached to an outermost side of the upper display panel or a lowermost side of the lower display panel, wherein the optical film may not be a polarizer.

The backlight unit may further include a light guide plate and a reflective sheet transferring light provided from the light source to the lower display panel.

A protrusion pattern may be formed on a lower surface of the light guide plate.

The liquid crystal display may further include a prism sheet having a prism pattern on an upper portion of the light guide plate.

The light source may provide ultraviolet rays or blue light.

According to the exemplary embodiment of the present invention, a color filter and a polarizer are not used to enhance transmittance, thus improving transmittance of a liquid crystal display. Further, it is possible to control a gray level by adjusting transmittance of light even though the polarizer is not used in the liquid crystal display.

DETAILED DESCRIPTION OF THE EMBODIMENTS

Figure 1:
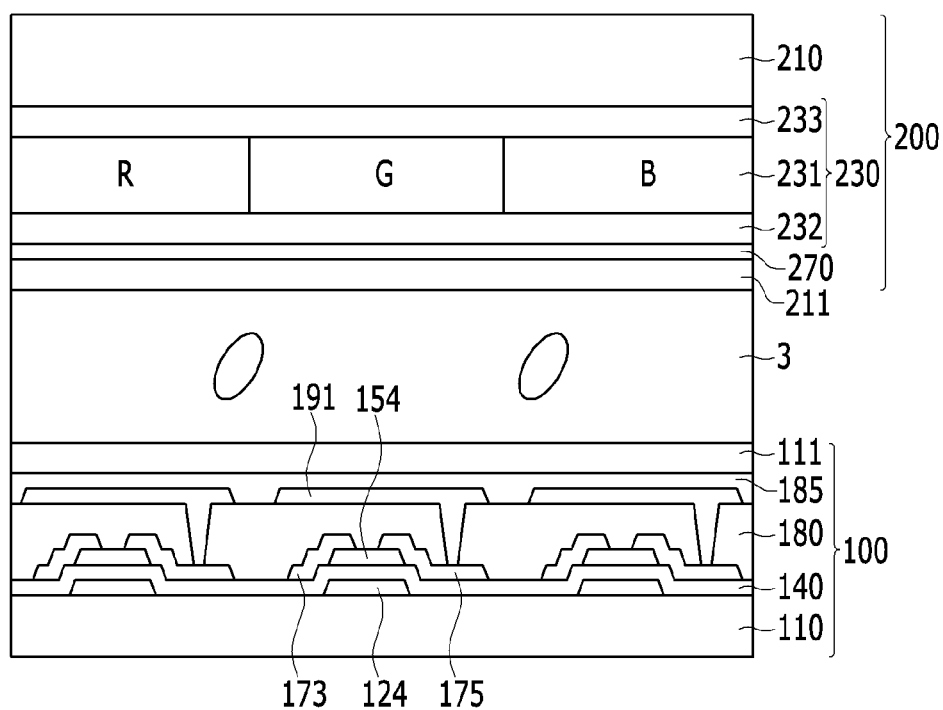
FIG. 1 is a cross-sectional view of a liquid crystal display according to an exemplary embodiment of the present invention.
Figure 1:
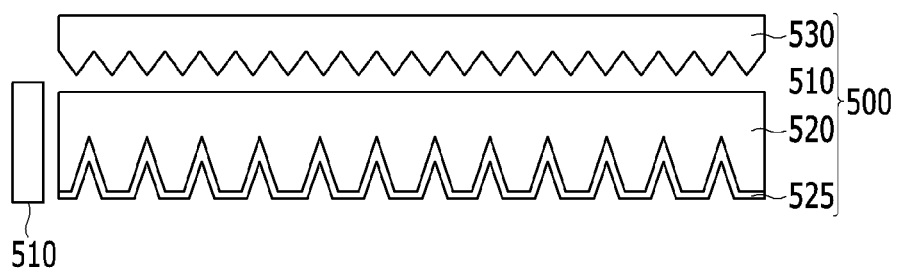

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment of the present invention will be described in detail with reference to FIG. 1.

FIG. 1 is a cross-sectional view of a liquid crystal display according to an exemplary embodiment of the present invention.

As shown in FIG. 1, the liquid crystal display according to the exemplary embodiment of the present invention includes a lower display panel 100, an upper display panel 200, a liquid crystal layer 3 positioned therebetween, and a backlight unit 500.

The backlight unit 500 includes a light source 510, a light guide plate 520, a reflector 525, and a prism sheet 530. The lower display panel 100 positioned on the backlight unit 500 includes a thin film transistor (TFT), a pixel electrode 191, and a lower reflective layer 111 on a lower insulating substrate 110. The upper display panel 200 positioned on the lower display panel 100 includes a fluorescent body unit 230, a common electrode 270, and an upper reflective layer 211 on an upper insulating substrate 210. The lower display panel 100 and the upper display panel 200 do not include a polarizer.

First, the backlight unit 500 will be described.

The backlight unit 500 includes the light source 510, the light guide plate 520, the reflector 525, and the prism sheet 530.

The light source 510 provides light having a wavelength band at which a fluorescent layer 231 formed in the upper display panel 200 is excited to display a color. Ultraviolet rays or a blue light source may be used according to the exemplary embodiment.

In the present exemplary embodiment, the light source 510 is positioned on a lateral surface of the light guide plate 520. A protrusion pattern is formed on a lower surface of the light guide plate 520. Further, the reflector 525 is positioned on the lower surface of the light guide plate 520. The reflector 525 may be a reflective sheet positioned under the protrusion pattern. The protrusion pattern and the reflector 525 of the light guide plate 520 serve to allow light provided from the light source 510 to progress in a vertical direction, thus providing light to the lower display panel 100.

The prism sheet 530 is positioned on the light guide plate 520. The prism sheet 530 includes a prism pattern. The prism pattern having a triangular cross-sectional structure may extend in one direction. The prism pattern may be replaced by a semicircular cross-sectional structure according to the exemplary embodiment. A hemispherical pattern may be used instead of the prism pattern according to the exemplary embodiment. The prism pattern in the present exemplary embodiment faces the light guide plate 520. Two prism sheets 530 may be used according to the exemplary embodiment, and in this case, the prism sheets may be positioned so that extension directions of the prism patterns are perpendicular to each other.

The prism sheet 530 may not be included according to the exemplary embodiment, and additional films (a luminance improving film, a diffuser and the like) may be further included in addition to the prism sheet 530.

Hereinafter, the lower display panel 100 will be described.

A gate line (not shown) including a gate electrode 124 is formed on the lower insulating substrate 110, and the gate line is covered with a gate insulating layer 140.

A semiconductor 154 is formed on the gate insulating layer 140. A data conductor partially covering the semiconductor 154 including a source electrode 173, a drain electrode 175, and a data line (not shown) is formed. The data conductor is covered with a first passivation layer 180. The drain electrode 175 of the data conductor is exposed through a contact hole formed in the first passivation layer 180.

The gate electrode 124, the semiconductor 154, the source electrode 173, and the drain electrode 175 form a thin film transistor (TFT), and a channel of the thin film transistor (TFT) is formed in the semiconductor 154. The gate electrode 124 may be a control terminal of the thin film transistor (TFT), the source electrode 173 may be an input terminal of the thin film transistor (TFT), and the drain electrode 175 may be an output terminal of the thin film transistor (TFT).

A pixel electrode 191 formed of a transparent conductive material such as ITO or IZO is formed on the first passivation layer 180, and electrically connected to the drain electrode 175 exposed through the contact hole.

The control terminal of the thin film transistor (TFT) is connected to the gate line, and the input terminal is connected to the data line. The output terminal of the thin film transistor (TFT) is connected to the pixel electrode 191.

The gate insulating layer 140 is formed between the gate line and the data line to be insulated from each other and cross each other.

A second passivation layer 185 is formed on the pixel electrode 191. The first passivation layer 180 and the second passivation layer 185 are formed of an insulating material including an inorganic material or an organic material. The second passivation layer 185 may be omitted according to the exemplary embodiment.

Figure 2:
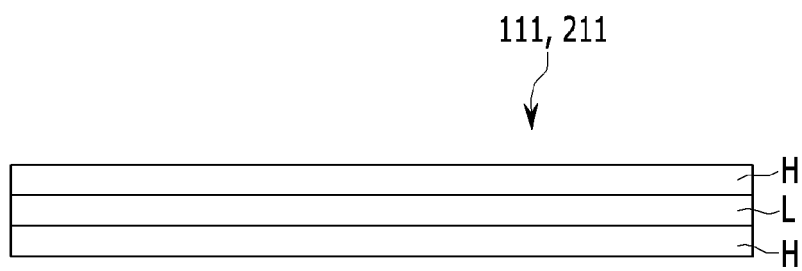
FIGS. 2 and 3 are cross-sectional views showing a reflective layer according to the exemplary embodiment of the present invention.
Figure 3:
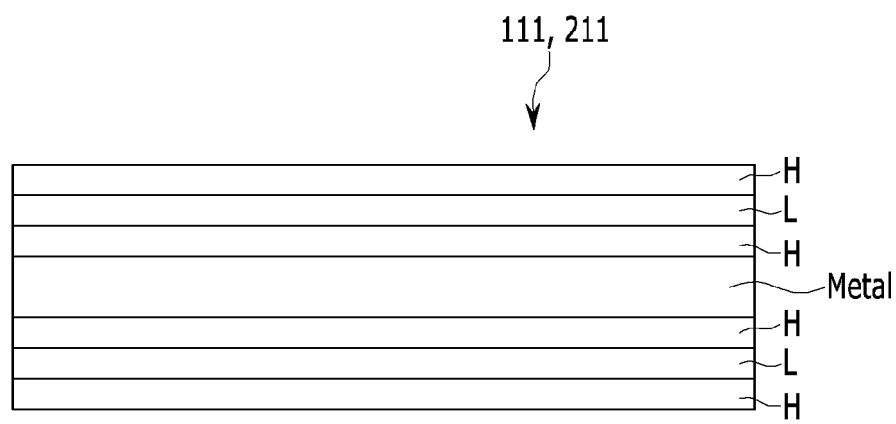

The lower reflective layer 111 is formed on the second passivation layer 185. The lower reflective layer 111 may have a structure including a multi-layered dielectric material or further including a metal layer in addition to the multi-layered dielectric material. FIGS. 2 and 3 show a layered structure of the reflective layer, and a description thereof will be given below.

An alignment layer (not shown) may be formed on the lower reflective layer 111.

As described above, the polarizer is not attached to the lower display panel 100.

Hereinafter, the upper display panel 200 will be described.

The fluorescent body unit 230 is formed under the upper insulating substrate 210. The fluorescent body unit 230 includes the fluorescent layer 231, a light blocking layer 233 positioned on an upper portion of the fluorescent layer 231, and a light transmission layer 232 positioned on a lower portion of the fluorescent layer 231. The light blocking layer 233 blocks light having a wavelength band at which the fluorescent layer 231 is excited in order to prevent excitation of the fluorescent layer 231 by light provided from the outside, and the light transmission layer 232 allows light having the wavelength band at which the fluorescent layer 231 is excited to be transmitted therethrough. In the case where the light source 510 provides ultraviolet rays, the light blocking layer 233 is a ultraviolet rays blocking layer and the light transmission layer 232 is a ultraviolet rays transmission layer. In the case where the light source 510 provides blue light, the light blocking layer 233 is a blue light blocking layer and the light transmission layer 232 is a blue light transmission layer. The light transmission layer 232 is positioned on the fluorescent layer 231 facing the backlight unit 500, and the light blocking layer 233 is positioned on the fluorescent layer 231 away from the backlight unit 500. At least one of the light transmission layer 232 and the light blocking layer 233 may be removed according to the exemplary embodiment.

The common electrode 270 and the upper reflective layer 211 are formed under the fluorescent body unit 230. The common electrode 270 is formed of a transparent conductive material such as ITO or IZO. The upper reflective layer 211 may have the structure including the multi-layered dielectric material or further including the metal layer in addition to the multi-layered dielectric material, and may be identical to the lower reflective layer 111. FIGS. 2 and 3 show a layered structure of the reflective layer, and a description thereof will be given later. In the exemplary embodiment of FIG. 1, the upper reflective layer 211 is positioned under the common electrode 270, but the position thereof may be changed according to the exemplary embodiment.

An alignment layer (not shown) may be formed on the upper reflective layer 211.

As described above, the polarizer is not attached to the upper display panel 200.

The liquid crystal layer 3 including liquid crystal molecules is positioned between the upper display panel 200 and the lower display panel 100. The liquid crystal layer 3 may be a vertical alignment (VA) mode, a horizontal alignment mode, or TN mode. A spacer (not shown) may be formed between the lower display panel 100 and the upper display panel 200 in order to maintain a predetermined cell gap, and the spacer may be formed on the upper display panel 200 or the lower display panel 100.

The aforementioned upper reflective layer 211 and lower reflective layer 111 may have a structure of FIG. 2 or 3.

FIGS. 2 and 3 are cross-sectional views showing a reflective layer according to the exemplary embodiment of the present invention.

FIG. 2 shows the exemplary embodiment including the multi-layered dielectric material, and FIG. 3 shows the exemplary embodiment further including the metal layer in addition to the multi-layered dielectric material.

First, referring to FIG. 2, the lower reflective layer 111 or the upper reflective layer 211 includes a dielectric layer having a high refractive index H (hereinafter, referred to as "high refractive index layer") and a dielectric layer having a low refractive index L (hereinafter, referred to as "low refractive index layer"), and has a structure where the high refractive index layer and the low refractive index layer are repeatedly laminated (hereinafter, referred to as "unit laminate structure"). In the exemplary embodiment of FIG. 2, the unit laminate structure has a triple layer structure where two upper and lower high refractive index layers are formed and the low refractive index layer is positioned therebetween. However, the unit laminate structure is not limited to the triple layer, but includes all the cases where two or more refractive index layers having different refractive indices are repeatedly laminated.

Further, referring to FIG. 3, the lower reflective layer 111 or the upper reflective layer 211 may have a structure including a metal layer formed between upper and lower unit laminate structures where the high refractive index layer and the low refractive index layer are repeatedly laminated. A pair of upper and lower unit laminate structures may have the same laminate structure like FIG. 3, or may have different laminate structures. The unit laminate structure is not limited to the triple layer, but includes all the cases where two or more refractive index layers are repeatedly laminated. Further, the metal layer may have a thickness in which light having a predetermined wavelength may be transmitted and light having a wavelength different from the predetermined wavelength may be reflected.

The aforementioned liquid crystal display does not include the polarizer, thus improving light efficiency. Moreover, light efficiency is improved by using the fluorescent layer 231 instead of the color filter which absorb light.

Further, light is resonated in a space between the upper reflective layer 211 and the lower reflective layer 111 (microcavity) to allow light having a predetermined wavelength to be transmitted through the upper reflective layer 211. In this case, a wavelength of transmitted light may be changed by controlling a refractive index of the liquid crystal layer, and the magnitude of transmitted light (transmittance) is changed according to a change in wavelength, such that it is possible to control a gray level. As described above, the characteristic of the liquid crystal display according to the exemplary embodiment of the present invention will be described with reference to FIGS. 4 to 6.

Figure 4:
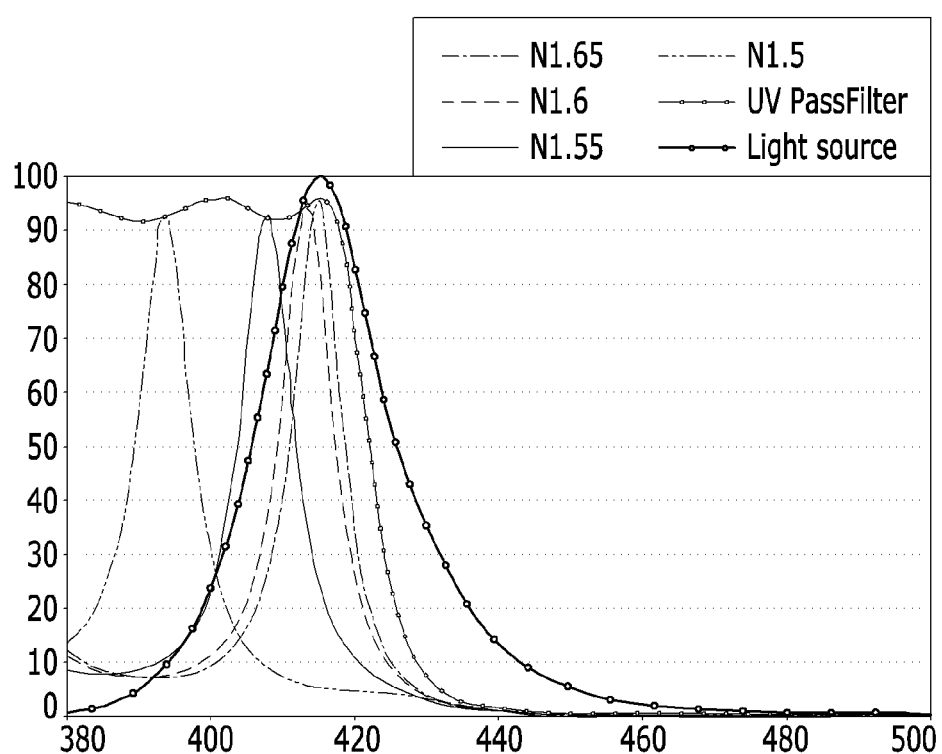
FIGS. 4 to 6 are graphs showing a characteristic of the liquid crystal display according to the exemplary embodiment of FIG. 1.
Figure 5:
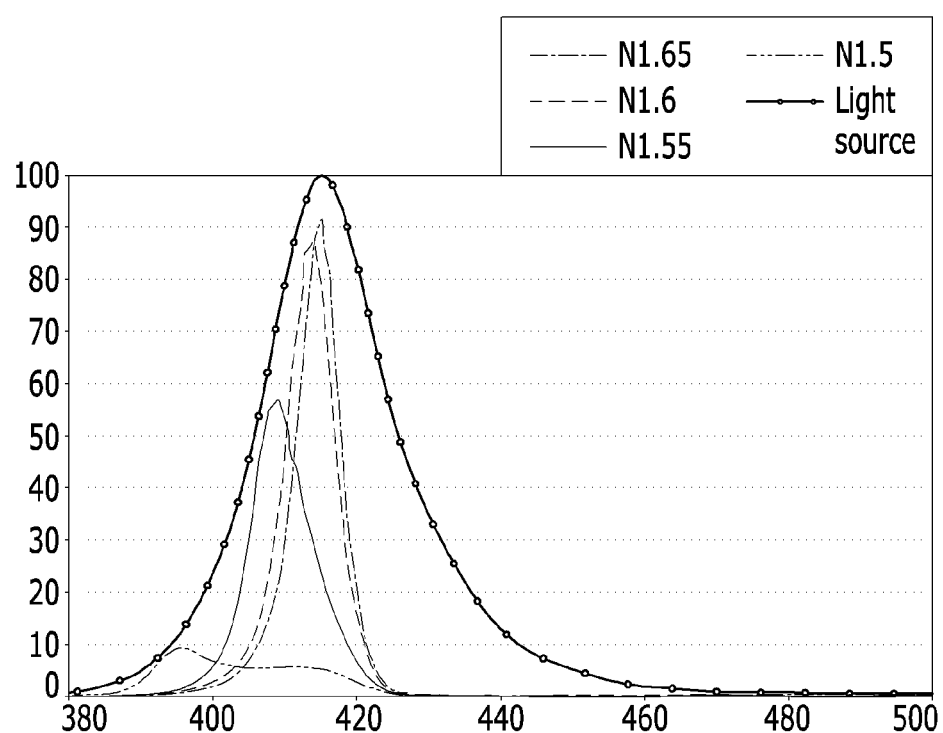
Figure 6:
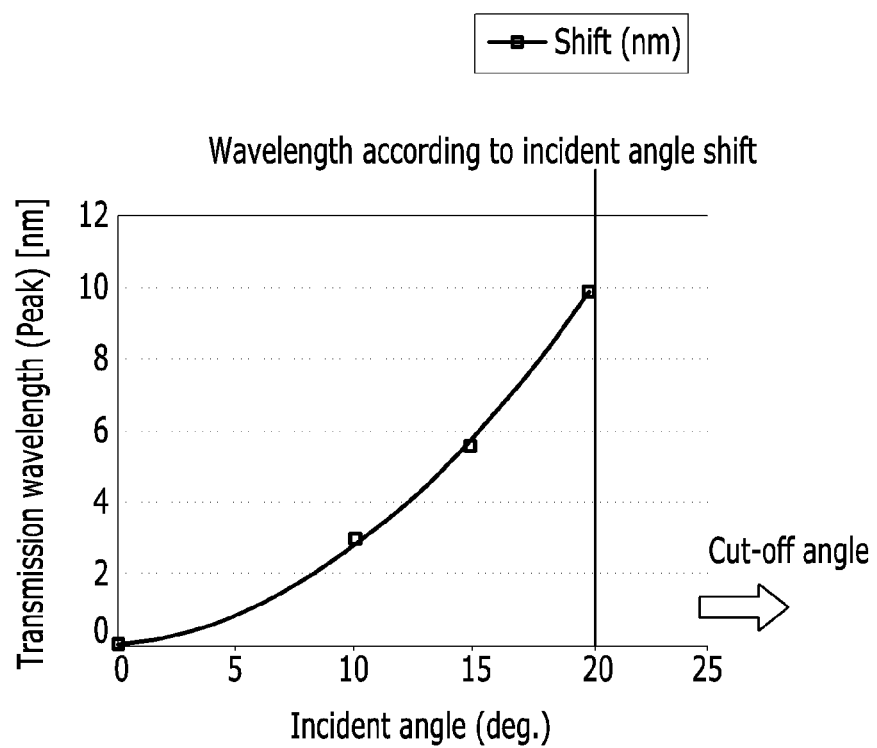

FIGS. 4 to 6 are graphs showing a characteristic of the liquid crystal display according to the exemplary embodiment of FIG. 1.

First, FIG. 4 is a graph for luminance with regard to the wavelength, in which luminance is expressed as a percentage based on 100 of the maximum luminance.

FIG. 4 shows the luminance graph for the wavelength of the light source used in the exemplary embodiment of the present invention, and shows the transmission characteristic of the light transmission layer 232 used in FIG. 1 as a "UV pass filter". In the exemplary embodiment of FIG. 1, the light source adopts ultraviolet rays, and the light transmission layer 232 adopts the ultraviolet rays transmission layer.

Further, FIG. 4 shows light that is resonated and emitted from the space between the upper reflective layer 211 and the lower reflective layer 111 (microcavity) according to refractive indices N of the liquid crystal layer 3. In case of TN mode liquid crystal, when twisting of liquid crystal molecules is very significant, the refractive index of the liquid crystal layer 3 is determined as an average refractive index of two refractive indices no and ne of the liquid crystal molecules. The refractive index of the liquid crystal layer 3 has a value of approximately the average refractive index of two refractive indices no and ne by applying an electric field between the pixel electrode 191 and the common electrode 270. The simulated characteristic of light emitted from the microcavity is shown in FIG. 4.

According to the increase of the refractive index N of the liquid crystal layer 3 from 1.5 to 1.55, 1.6, and 1.65, the wavelength of light emitted from the microcavity is increased. Since the characteristic in FIG. 4 is obtained by simulation, the luminance is higher than the luminance provided from the light source.

However, since the luminance is limited by the luminance value for wavelength provided from the light source, the luminance characteristic of light emitted from the microcavity is the same as that of FIG. 5. Moreover, FIG. 5 shows that light not corresponding to the transmission wavelength band is blocked by the light transmission layer 232. That is, the graph shown in FIG. 5 is a characteristic of actual light that is incident on the fluorescent layer 231 of the fluorescent body unit 230.

According to FIG. 5, the wavelength of light emitted from the microcavity is gradually increased in accordance with the increase of the refractive index N from 1.5 to 1.55, 1.6, and 1.65, and thus, the luminance of light is increased. The fluorescent layer 231 of the fluorescent body unit 230 emits light by incident light to display the corresponding color, and if the incident luminance is decreased, the amount of light emitted from the fluorescent layer 231 is decreased too.

Therefore, the refractive index N of the liquid crystal layer 3 is adjusted by adjusting the voltage of the pixel electrode 191 to change the luminance of light emitted from the microcavity, such that it is possible to control a gray level by changing the degree of light emission of the fluorescent layer 231.

FIGS. 4 and 5 are results when using the TN mode liquid crystal layer 3. However, when the vertical alignment (VA) mode liquid crystal layer is used, the wavelength band of transmitted light is reduced as the refractive index N is increased.

FIG. 6 shows a simulated change in peak wavelength of light resonated and emitted from the microcavity according to the angle of light that is incident on the microcavity. In FIG. 6, a horizontal axis is 0 in the case where light is vertically incident on the lower reflective layer 111. Incident angle is a angle formed between a light incident on the surface of the lower reflective layer and a line vertical to the lower reflective layer 111. The vertical axis of FIG. 6 represents a change in peak value of the transmission wavelength in a nm unit, which is a value calculated based on light that is vertically incident.

As the incident angle is increased, the peak wavelength of light emitted from the microcavity is changed. In the case where light is incident at an angle of about 20°, the wavelength of light emitted from the microcavity is changed to 10 nm. When light is incident at a larger angle than about 20°, the light does not progress to fluorescent layer 231 because the light is blocked by the light transmission layer 232.

As a result, a color parallax problem, where light that should be incidented on the adjacent pixel is incident on the fluorescent layer 231 of the pixel incorrectly, is reduced.

As described above, the light transmission layer 232 of the fluorescent body unit 230 prevents a color parallax problem t by filtering light that is incident on the fluorescent layer 231. Further, the light blocking layer 233 of the fluorescent body unit 230 protect ambient light from incident on the fluorescent layer 231 to provide a image to a user without a noise.

Hereinafter, the exemplary embodiment of FIG. 7 that is another exemplary embodiment of the present invention will be described.

Figure 7:
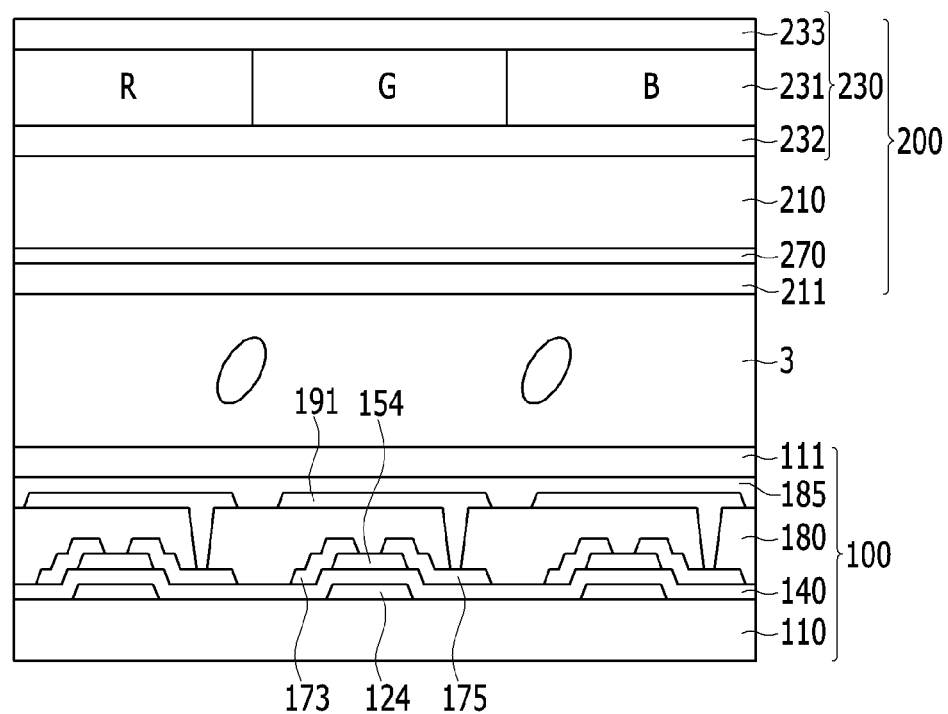
FIG. 7 is a cross-sectional view of a liquid crystal display according to another exemplary embodiment of the present invention.
Figure 7:
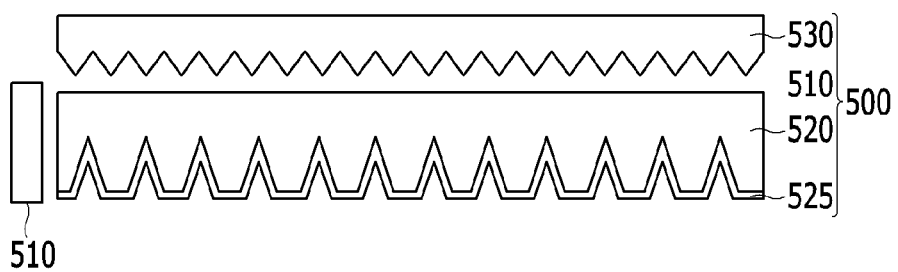

In the exemplary embodiment of FIG. 7, the fluorescent body unit 230 is positioned at the external side of the upper insulating substrate 210 unlike the exemplary embodiment of FIG. 1.

FIG. 7 is a cross-sectional view of a liquid crystal display according to another exemplary embodiment of the present invention.

As shown in FIG. 7, the liquid crystal display according to the exemplary embodiment of the present invention includes a lower display panel 100, an upper display panel 200, a liquid crystal layer 3 positioned therebetween, and a backlight unit 500.

The backlight unit 500 includes a light source 510, a light guide plate 520, a reflector 525, and a prism sheet 530. The lower display panel 100 positioned on the backlight unit 500 includes a thin film transistor (TFT), a pixel electrode 191, and a lower reflective layer 111 on a lower insulating substrate 110. The upper display panel 200 positioned on the lower display panel 100 includes a fluorescent body unit 230, a common electrode 270, and an upper reflective layer 211 on an upper insulating substrate 210. The lower display panel 100 and the upper display panel 200 do not include a polarizer.

First, the backlight unit 500 will be described.

The backlight unit 500 includes the light source 510, the light guide plate 520, the reflector 525, and the prism sheet 530.

The light source 510 provides light having a wavelength band at which a fluorescent layer 231 formed in the upper display panel 200 displays a color, and ultraviolet rays or a blue light source may be used according to the exemplary embodiment.

In the present exemplary embodiment, the light source 510 is positioned on a lateral surface of the light guide plate 520. A protrusion pattern is formed on a lower surface of the light guide plate 520. Further, the reflector 525 is positioned on the lower surface of the light guide plate 520. The reflector 525 may be a reflective sheet positioned under the protrusion pattern. The protrusion pattern and the reflector 525 of the light guide plate 520 serve to allow light provided from the light source 510 to progress in a vertical direction, thus providing light to the lower display panel 100.

The prism sheet 530 is positioned on the light guide plate 520. The prism sheet 530 includes a prism pattern. The prism pattern having a triangular cross-sectional structure may extend in one direction. The prism pattern may be replaced by a semicircular cross-sectional structure according to the exemplary embodiment. A hemispherical pattern may be used instead of the prism pattern according to the exemplary embodiment. The prism pattern in the present exemplary embodiment faces the light guide plate 520. The two prism sheets 530 may be used according to the exemplary embodiment, and in this case, the prism sheets may be positioned so that extension directions of the prism patterns are perpendicular to each other.

The prism sheet 530 may not be included according to the exemplary embodiment, and additional films (a luminance improving film, a diffuser and the like) may be further included in addition to the prism sheet 530.

Hereinafter, the lower display panel 100 will be described.

A gate line (not shown) including a gate electrode 124 is formed on the lower insulating substrate 110, and the gate line is covered with the gate insulating layer 140.

The semiconductor 154 is formed on the gate insulating layer 140. A data conductor partially covering the semiconductor 154 including a source electrode 173, a drain electrode 175, and a data line (not shown) is formed. The data conductor is covered with a first passivation layer 180. The drain electrode 175 of the data conductor is exposed through a contact hole formed in the first passivation layer 180.

The gate electrode 124, the semiconductor 154, the source electrode 173, and the drain electrode 175 form the thin film transistor (TFT), and a channel of the thin film transistor (TFT) is formed in the semiconductor 154. The gate electrode 124 may be a control terminal of the thin film transistor (TFT), the source electrode 173 may be an input terminal of the thin film transistor (TFT), and the drain electrode 175 may be an output terminal of the thin film transistor (TFT).

A pixel electrode 191 formed of a transparent conductive material such as ITO or IZO is formed on the first passivation layer 180, and electrically connected to the drain electrode 175 exposed through the contact hole.

The control terminal of the thin film transistor (TFT) is connected to the gate line, and the input terminal is connected to the data line. The output terminal of the thin film transistor (TFT) is connected to the pixel electrode 191.

The gate insulating layer 140 is formed between the gate line and the data line to be insulated from each other and cross each other.

A second passivation layer 185 is formed on the pixel electrode 191. The first passivation layer 180 and the second passivation layer 185 are formed of the insulating material including the inorganic material or the organic material. The second passivation layer 185 may be omitted according to the exemplary embodiment.

The lower reflective layer 111 is formed on the second passivation layer 185. The lower reflective layer 111 may have the structure including the multi-layered dielectric material or further including the metal layer in addition to the multi-layered dielectric material. FIGS. 2 and 3 show a layered structure of the reflective layer, and a description thereof will be given below.

An alignment layer (not shown) may be formed on the lower reflective layer 111.

As described above, the polarizer is not attached to the lower display panel 100.

Hereinafter, the upper display panel 200 will be described.

The fluorescent body unit 230 is formed at the external side of the upper insulating substrate 210. The fluorescent body unit 230 includes the fluorescent layer 231, a light blocking layer 233 positioned on an upper portion of the fluorescent layer 231, and a light transmission layer 232 positioned on a lower portion of the fluorescent layer 231. The light blocking layer 233 blocks light having a wavelength band at which the fluorescent layer 231 is excited in order to prevent excitation of the fluorescent layer 231 by light provided from the outside, and the light transmission layer 232 allows light having the wavelength band at which the fluorescent layer 231 is excited to be transmitted therethrough. In the case where the light source 510 provides ultraviolet rays, the light blocking layer 233 is a ultraviolet rays blocking layer and the light transmission layer 232 is a ultraviolet rays transmission layer. In the case where the light source 510 provides blue light, the light blocking layer 233 is a blue light blocking layer and the light transmission layer 232 is a blue light transmission layer. The light transmission layer 232 is positioned on the fluorescent layer 231 facing the backlight unit 500, and the light blocking layer 233 is positioned on the fluorescent layer 231 away from the backlight unit 500. At least one of the light transmission layer 232 and the light blocking layer 233 may be removed according to the exemplary embodiment.

The common electrode 270 and the upper reflective layer 211 are formed under the upper insulating substrate 210. The common electrode 270 is formed of a transparent conductive material such as ITO or IZO. The upper reflective layer 211 may have the structure including the multi-layered dielectric material or further including the metal layer in addition to the multi-layered dielectric material, and may be identical to the lower reflective layer 111. FIGS. 2 and 3 show a layered structure of the reflective layer, and a description thereof will be given below. In the exemplary embodiment of FIG. 7, the upper reflective layer 211 is positioned under the common electrode 270, but the position thereof may be changed according to the exemplary embodiment.

An alignment layer (not shown) may be formed on the upper reflective layer 211.

As described above, the polarizer is not attached to the upper display panel 200.

The liquid crystal layer 3 including liquid crystal molecules is positioned between the upper display panel 200 and the lower display panel 100. The liquid crystal layer 3 may be the vertical alignment (VA) mode, the horizontal alignment mode, or TN mode.

The aforementioned upper reflective layer 211 and lower reflective layer 111 may have a structure of FIG. 2 or 3.

FIGS. 2 and 3 are cross-sectional views showing a reflective layer according to the exemplary embodiment of the present invention.

FIG. 2 shows the exemplary embodiment including the multi-layered dielectric material, and FIG. 3 shows the exemplary embodiment further including the metal layer in addition to the multi-layered dielectric material.

First, referring to FIG. 2, the lower reflective layer 111 or the upper reflective layer 211 includes the high refractive index layer and the low refractive index layer, and has a unit laminate structure where the high refractive index layer and the low refractive index layer are repeatedly laminated. In the exemplary embodiment of FIG. 2, the unit laminate structure has a triple layer structure where two upper and lower high refractive index layers are formed and the low refractive index layer is positioned therebetween. However, the unit laminate structure is not limited to the triple layer, but includes all the cases where two or more refractive index layers having different refractive indices are repeatedly laminated.

Further, referring to FIG. 3, the lower reflective layer 111 or the upper reflective layer 211 may have a structure including a metal layer formed between upper and lower unit laminate structures where the high refractive index layer and the low refractive index layer are repeatedly laminated. A pair of upper and lower unit laminate structures may have the same laminate structure like FIG. 3, or may have different laminate structures. The unit laminate structure is not limited to the triple layer, but includes all the cases where two or more refractive index layers are repeatedly laminated. Further, the metal layer may have a thickness in which light having a predetermined wavelength may be transmitted and light having a wavelength different from the predetermined wavelength may be reflected.

In the exemplary embodiment of FIG. 7, the fluorescent body unit 230 may be formed at the external side of the upper insulating substrate 210. As a result a user can recognize the pattern of the fluorescent body unit 230 unlike the exemplary embodiment of FIG. 1. In this case, an additional optical film may be attached to the external side of the fluorescent body unit 230 so that the user cannot recognize the pattern of the fluorescent body unit 230. Various films may be used as the optical film, and a protective film, a coating film, an anti-fringe film preventing foreign particles, anti-reflection or anti-glare film preventing a display quality from being deteriorated by reflecting external light, or the like may be used. The optical films may serve to prevent the pattern of the fluorescent body unit 230 from being recognized.

The aforementioned liquid crystal display does not include the polarizer, thus improving light efficiency. Moreover, light efficiency is improved by using the fluorescent layer 231 instead of the color filter which absorb light.

Further, light is resonated in a space between the upper reflective layer 211 and the lower reflective layer 111 (microcavity) to allow light having a predetermined wavelength to be transmitted through the upper reflective layer 211. In this case, a wavelength of transmitted light may be changed by controlling a refractive index of the liquid crystal layer, and the magnitude of transmitted light (transmittance) is changed according to a change in wavelength, such that it is possible to control a gray level. The characteristic of the exemplary embodiment of FIG. 7 will be described through FIGS. 8 and 9.

Figure 8:
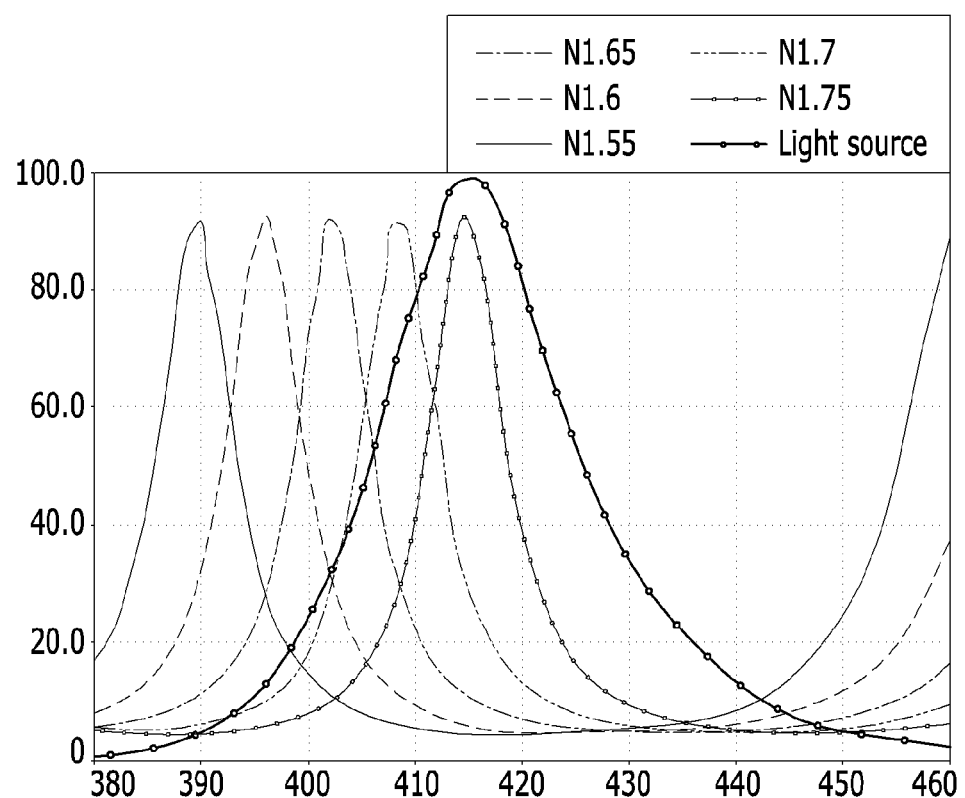
FIGS. 8 and 9 are graphs showing a characteristic of the liquid crystal display according to the exemplary embodiment of FIG. 7.
Figure 9:
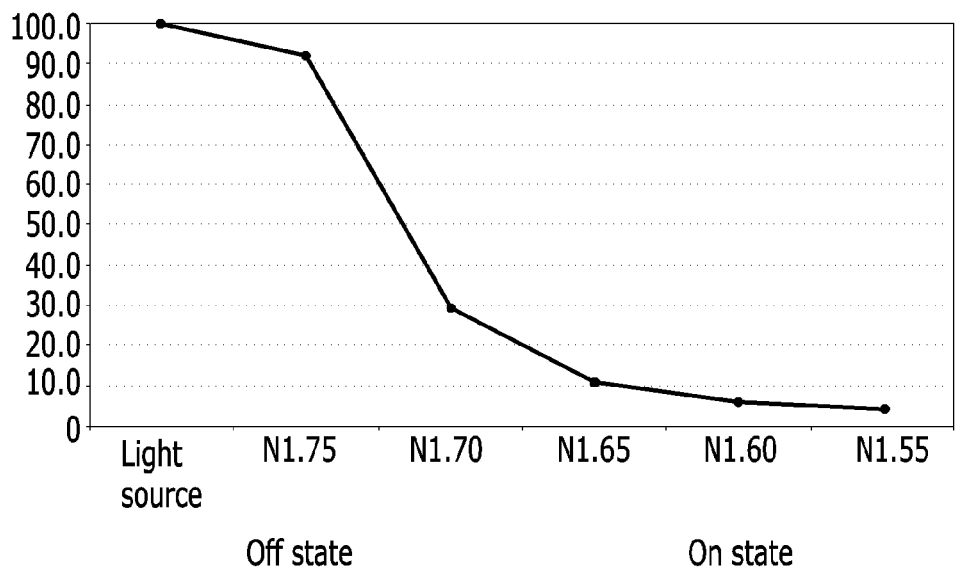

FIGS. 8 and 9 are graphs showing a characteristic of the liquid crystal display according to the exemplary embodiment of FIG. 7.

First, FIG. 8 is a graph for luminance with regard to the wavelength, in which luminance is expressed as a percentage based on 100 of the maximum luminance.

FIG. 8 shows the luminance graph for the wavelength of the light source used in the exemplary embodiment of the present invention. In the exemplary embodiment of FIG. 7, ultraviolet rays are used as the light source.

Further, FIG. 8 shows light that is resonated and emitted from the space between the upper reflective layer 211 and the lower reflective layer 111 (microcavity) by the refractive indices N of the liquid crystal layer 3. In case of TN mode liquid crystal when twisting of liquid crystal molecules is very significant, the refractive index of the liquid crystal layer 3 is determined as an average refractive index of two refractive indices no and ne of the liquid crystal molecules. The refractive index of the liquid crystal layer 3 has a value of approximately the average refractive index of two refractive indices no and ne by applying an electric field between the pixel electrode 191 and the common electrode 270. The simulated characteristic of light emitted from the microcavity is shown in FIG. 8.

According to the increase of the refractive index N of the liquid crystal layer 3 from 1.5 to 1.55, 1.6, and 1.65, the wavelength of light emitted from the microcavity is increased. Since the characteristic in FIG. 8 is obtained by simulation, the luminance is higher than the luminance provided from the light source.

However, since the luminance is limited by the luminance value for wavelength provided from the light source, the luminance characteristic of light emitted from the microcavity cannot be higher than the luminance of the light source. (See FIG. 5)

Therefore, the result of FIG. 8 is different from the actual luminance of light emitted from the microcavity, the reduced luminance based on the graph of the light source is the actual luminance of light emitted from the microcavity.

The characteristic of FIG. 8 is similar to the characteristic of FIG. 4. That is, there is a difference between the exemplary embodiments of FIGS. 1 and 7, but it can be seen that the characteristics of light emitted from the microcavity do not have the structural difference and are almost similar to each other.

With regard to the exemplary embodiment of FIG. 7, FIG. 9 shows the graph of luminance of light emitted from the microcavity according to the refractive index N of the liquid crystal layer 3.

As confirmed in the graph of FIG. 9, as the refractive index N of the liquid crystal layer 3 is reduced, the luminance of light emitted from the microcavity is reduced. That is, as the refractive index N of the liquid crystal layer 3 is gradually increased from 1.5 to 1.55, 1.6, and 1.65, the luminance of light emitted from the microcavity is increased. The refractive index N of the liquid crystal layer 3 and the luminance of light emitted from the microcavity are not in a linear proportional relationship, but the luminance of light emitted from the microcavity may be adjusted by adjusting the refractive index N of the liquid crystal layer 3. As a result, the fluorescent layer 231 of the fluorescent body unit 230 may adjust the magnitude of incident light. Therefore, the degree of light incident on the fluorescent layer 231 can be adjusted to display the gray. The refractive index N of the liquid crystal layer 3 may be changed by an electric field generated due to a difference between voltages of the pixel electrode 191 and the common electrode 270, and the voltage of the common electrode 270 may be constantly maintained, such that it is possible to adjust the luminance of transmitted light to control the gray level without the polarizer by adjusting the voltage of the pixel electrode 191.

FIGS. 8 and 9 are results when using the TN mode liquid crystal layer 3. However when the vertical alignment (VA) mode liquid crystal layer is used, the wavelength band of transmitted light is reduced as the refractive index N is increased.

Hereinafter, yet another exemplary embodiment of the present invention will be described through FIGS. 10 to 14.

FIGS. 10 to 14 are cross-sectional views of the liquid crystal display according to yet another exemplary embodiment of the present invention.

First, the exemplary embodiment of FIG. 10 will be described.

Figure 10:
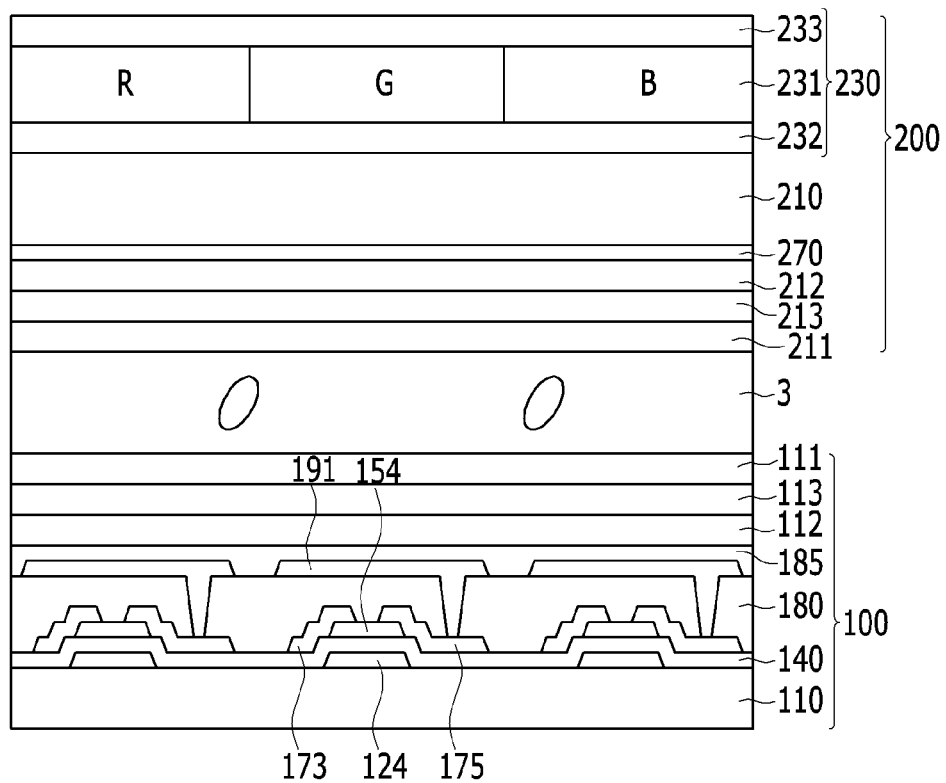
FIGS. 10 to 14 are cross-sectional views of the liquid crystal display according to yet another exemplary embodiment of the present invention.
Figure 10:
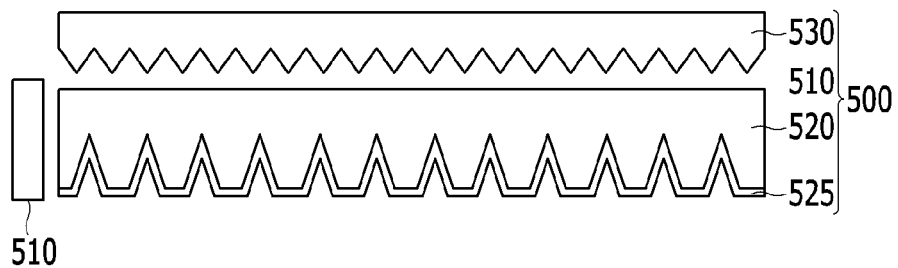

In the exemplary embodiment of FIG. 10, the fluorescent body unit 230 is positioned at the external side of the upper insulating substrate 210 unlike the exemplary embodiment of FIG. 1, and further includes a pair of reflective layers 112 and 212 unlike the exemplary embodiments of FIGS. 1 and 7.

As shown in FIG. 10, the liquid crystal display according to the exemplary embodiment of the present invention includes the lower display panel 100, the upper display panel 200, the liquid crystal layer 3 positioned therebetween, and the backlight unit 500.

The backlight unit 500 includes the light source 510, the light guide plate 520, the reflector 525, and the prism sheet 530. The lower display panel 100 positioned on the backlight unit 500 includes the thin film transistor (TFT), the pixel electrode 191, and the first and the second lower reflective layers 111 and 112 on the lower insulating substrate 110. The upper display panel 200 positioned on the lower display panel 100 includes the fluorescent body unit 230, the common electrode 270, and the first and the second upper reflective layers 211 and 212 on the upper insulating substrate 210. The lower display panel 100 and the upper display panel 200 do not include a polarizer.

First, the backlight unit 500 will be described.

The backlight unit 500 includes the light source 510, the light guide plate 520, the reflector 525, and the prism sheet 530.

The light source 510 provides light having a wavelength band at which the fluorescent layer 231 formed in the upper display panel 200 displays a color. Ultraviolet rays or a blue light source may be used according to the exemplary embodiment.

In the present exemplary embodiment, the light source 510 is positioned on the lateral surface of the light guide plate 520. The protrusion pattern is formed on the lower surface of the light guide plate 520. Further, the reflector 525 is positioned on the lower surface of the light guide plate 520. The reflector 525 may be a reflective sheet positioned under the protrusion pattern. The protrusion pattern and the reflector 525 of the light guide plate 520 serve to allow light provided from the light source 510 to progress in a vertical direction, thus providing light to the lower display panel 100.

The prism sheet 530 is positioned on the light guide plate 520. The prism sheet 530 includes the prism pattern. The prism pattern having a triangular cross-sectional structure may extend in one direction. The prism pattern may be replaced by a semicircular cross-sectional structure according to the exemplary embodiment. A hemispherical pattern may be used instead of the prism pattern according to the exemplary embodiment. The prism pattern in the present exemplary embodiment faces the light guide plate 520. The two prism sheets 530 may be used according to the exemplary embodiment, and in this case, the prism sheets may be positioned so that extension directions of the prism patterns are perpendicular to each other.

The prism sheet 530 may not be included according to the exemplary embodiment, and additional films (a luminance improving film, a diffuser and the like) may be further included in addition to the prism sheet 530.

Hereinafter, the lower display panel 100 will be described.

The gate line (not shown) including the gate electrode 124 is formed on the lower insulating substrate 110, and the gate line is covered with the gate insulating layer 140.

The semiconductor 154 is formed on the gate insulating layer 140. The data conductor partially covering the semiconductor 154 including the source electrode 173, the drain electrode 175, and the data line (not shown) is formed. The data conductor is covered with the first passivation layer 180. The drain electrode 175 of the data conductor is exposed through the contact hole formed in the first passivation layer 180.

The gate electrode 124, the semiconductor 154, the source electrode 173, and the drain electrode 175 form the thin film transistor (TFT), and the channel of the thin film transistor (TFT) is formed in the semiconductor 154. The gate electrode 124 may be the control terminal of the thin film transistor (TFT), the source electrode 173 may be the input terminal of the thin film transistor (TFT), and the drain electrode 175 may be the output terminal of the thin film transistor (TFT).

The pixel electrode 191 formed of the transparent conductive material such as ITO or IZO is formed on the first passivation layer 180, and electrically connected to the drain electrode 175 exposed through the contact hole.

The control terminal of the thin film transistor (TFT) is connected to the gate line, and the input terminal is connected to the data line. The output terminal of the thin film transistor (TFT) is connected to the pixel electrode 191.

The gate insulating layer 140 is formed between the gate line and the data line to be insulated from each other and cross each other.

The second passivation layer 185 is formed on the pixel electrode 191. The first passivation layer 180 and the second passivation layer 185 are formed of the insulating material including the inorganic material or the organic material. The second passivation layer 185 may be omitted according to the exemplary embodiment.

The second lower reflective layer 112 is formed on the second passivation layer 185. The lower dielectric layer 113 is formed on the second lower reflective layer 112, and the first lower reflective layer 111 is formed on the lower dielectric layer 113. The first and the second lower reflective layers 111 may have the structure including the multi-layered dielectric material or further including the metal layer in addition to the multi-layered dielectric material. (See FIGS. 2 and 3) The lower dielectric layer 113 may be formed of a material having dielectricity, which may be an insulating material.

The alignment layer (not shown) may be formed on the first lower reflective layer 111.

As described above, the polarizer is not attached to the lower display panel 100.

Hereinafter, the upper display panel 200 will be described.

The fluorescent body unit 230 is formed at the external side of the upper insulating substrate 210. The fluorescent body unit 230 includes the fluorescent layer 231, the light blocking layer 233 positioned on the upper portion of the fluorescent layer 231, and the light transmission layer 232 positioned on the lower portion of the fluorescent layer 231. The light blocking layer 233 blocks light having a wavelength band at which the fluorescent layer 231 is excited in order to prevent excitation of the fluorescent layer 231 by light provided from the outside, and the light transmission layer 232 allows light having the wavelength band at which the fluorescent layer 231 is excited to be transmitted therethrough. In the case where the light source 510 provides ultraviolet rays, the light blocking layer 233 is a ultraviolet rays blocking layer and the light transmission layer 232 is a ultraviolet rays transmission layer. In the case where the light source 510 provides blue light, the light blocking layer 233 is a blue light blocking layer and the light transmission layer 232 is a blue light transmission layer. The light transmission layer 232 is positioned on the fluorescent layer facing the backlight unit 500, and the light blocking layer 233 is positioned on the fluorescent layer 231 away from the backlight unit 500. At least one of the light transmission layer 232 and the light blocking layer 233 may be removed according to the exemplary embodiment.

The common electrode 270, the first and the second upper reflective layers 211 and 212, and the upper dielectric layer 213 are formed under the upper insulating substrate 210. The common electrode 270 is formed of a transparent conductive material such as ITO or IZO. The first and the second upper reflective layers 211 and 212 may have the structure including the multi-layered dielectric material or further including the metal layer in addition to the multi-layered dielectric material, and may be identical to the lower reflective layer 111. (See FIGS. 2 and 3) The common electrode 270 is positioned under the upper insulating substrate 210, the second upper reflective layer 212 is positioned under the common electrode 270, the upper dielectric layer 213 is positioned thereunder, and the first upper reflective layer 211 is positioned thereunder.

The alignment layer (not shown) may be formed under the first upper reflective layer 211.

As described above, the polarizer is not attached to the upper display panel 200.

The liquid crystal layer 3 including liquid crystal molecules is positioned between the upper display panel 200 and the lower display panel 100. The liquid crystal layer 3 may be the vertical alignment (VA) mode, the horizontal alignment mode, or TN mode.

The aforementioned first and second upper reflective layers 211 and 212 and first and second lower reflective layers 111 and 112 may have a structure of FIG. 2 or 3.

FIGS. 2 and 3 are cross-sectional views showing a reflective layer according to the exemplary embodiment of the present invention.

FIG. 2 shows the exemplary embodiment including the multi-layered dielectric material, and FIG. 3 shows the exemplary embodiment further including the metal layer in addition to the multi-layered dielectric material.

First, referring to FIG. 2, the first and the second upper reflective layers 211 and 212 or the first and the second lower reflective layers 111 and 112 include the high refractive index layer and the low refractive index layer, and have a unit laminate structure where the high refractive index layer and the low refractive index layer are repeatedly laminated. In the exemplary embodiment of FIG. 2, the unit laminate structure has a triple layer structure where two upper and lower high refractive index layers are formed and the low refractive index layer is positioned therebetween. However, the unit laminate structure is not limited to the triple layer, but includes all the cases where two or more refractive index layers having different refractive indices are repeatedly laminated.

Further, referring to FIG. 3, the first and the second upper reflective layers 211 and 212 or the first and the second lower reflective layers 111 and 112 may have a structure including a metal layer formed between upper and lower unit laminate structures where the high refractive index layer and the low refractive index layer are repeatedly laminated. A pair of upper and lower unit laminate structures may have the same laminate structure like FIG. 3, or may have different laminate structures. The unit laminate structure is not limited to the triple layer, but includes all the cases where two or more refractive index layers are repeatedly laminated. Further, the metal layer may have a thickness in which light having a predetermined wavelength may be transmitted and light having a wavelength different from the predetermined wavelength may be reflected.

The aforementioned liquid crystal display does not include the polarizer, thus improving light efficiency. Moreover, light efficiency is improved by using the fluorescent layer 231 instead of the color filter which absorb light.

Further, light is resonated in the space between the first upper reflective layer 211 and the first lower reflective layer 111 (microcavity) to allow light having a predetermined wavelength to be transmitted through the first upper reflective layer 211. In this case, a wavelength of transmitted light may be changed by controlling a refractive index of the liquid crystal layer, and the magnitude of transmitted light (transmittance) is changed according to a change in wavelength, such that it is possible to control a gray level.

Meanwhile, the additionally formed second lower reflective layer 112 and second upper reflective layer 212 form the microcavities adopting the dielectric layer together with the lower dielectric layer 113 and the upper dielectric layer 213 positioned therein. That is, the first and the second lower reflective layers 111 and 112 and the lower dielectric layer 113 interposed therebetween form the microcavity, and the first and the second upper reflective layers 211 and 212 and the upper dielectric layer 213 interposed therebetween form the microcavity. The additionally formed microcavity is a microcavity (hereinafter, referred to as "dielectric material microcavity") including the dielectric layer therein, and the microcavity including the first upper reflective layer 211 and the first lower reflective layer 111 includes the liquid crystal layer 3, and thus is referred to as a "liquid crystal layer microcavity".

In the exemplary embodiment of FIG. 10, the wavelength of light resonated and transmitted by the added dielectric material microcavity may be adjusted so as to have a broader wavelength band. This will be described through FIG. 16 in detail.

Hereinafter, the exemplary embodiment of FIG. 11 will be described.

Figure 11:
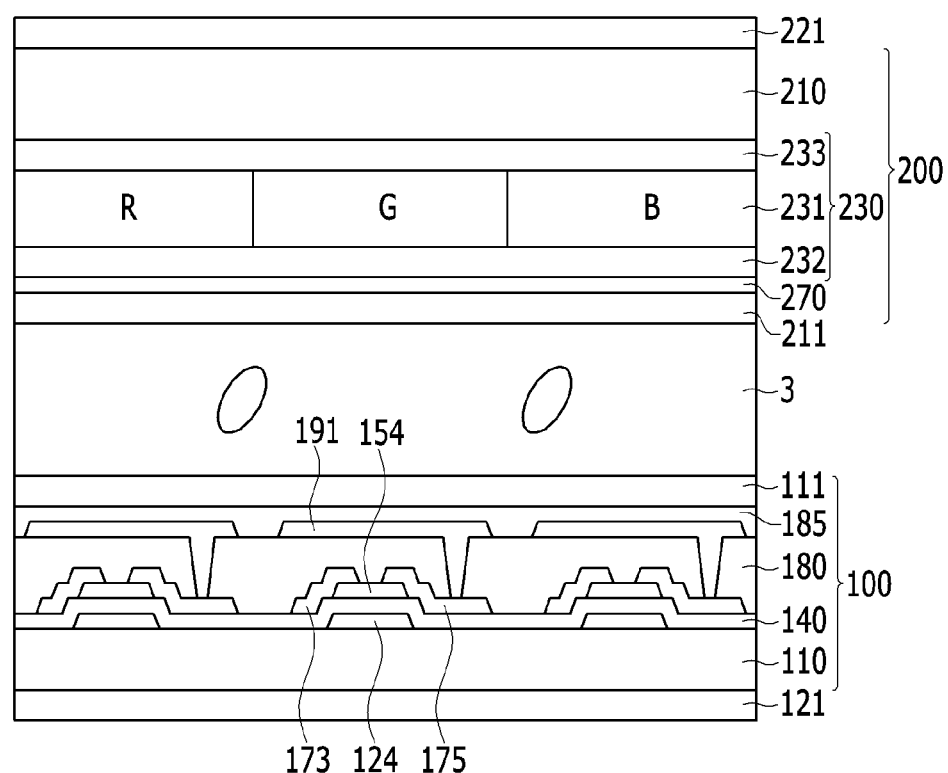
Figure 11:
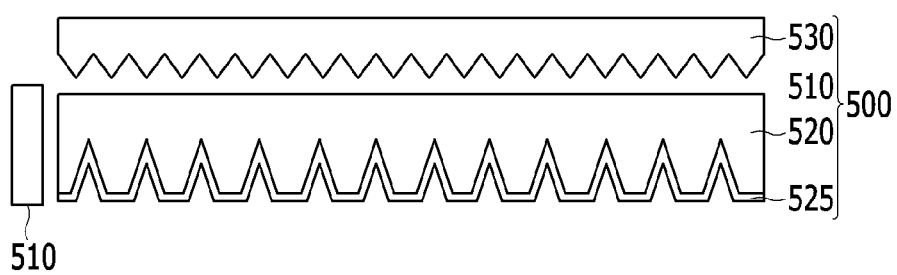

The exemplary embodiment of FIG. 11 is an exemplary embodiment where optical films 221 and 121 are additionally formed on the external sides of the display panels 100 and 200 unlike the exemplary embodiment of FIG. 1.

As shown in FIG. 11, the liquid crystal display according to the exemplary embodiment of the present invention includes the lower display panel 100, the upper display panel 200, the liquid crystal layer 3 positioned therebetween, and the backlight unit 500.

The backlight unit 500 includes the light source 510, the light guide plate 520, the reflector 525, and the prism sheet 530. The lower display panel 100 positioned on the backlight unit 500 includes the thin film transistor (TFT), the pixel electrode 191, and the lower reflective layer 111 on the lower insulating substrate 110. The upper display panel 200 positioned on the lower display panel 100 includes the fluorescent body unit 230, the common electrode 270, and the upper reflective layer 211 on the upper insulating substrate 210. The lower display panel 100 and the upper display panel 200 do not include the polarizer.

The backlight unit 500 of the exemplary embodiment of FIG. 11 is not different from the backlight unit 500 of FIG. 1, thus, an additional description will be omitted.

Further, the lower display panel 100 is similar to the exemplary embodiment of FIG. 1. However, there is a difference in that the optical film 121 is attached to the lowermost side (backlight unit 500 side) of the lower display panel 100.

The upper display panel 200 is similar to the exemplary embodiment of FIG. 1, but has a different in that the optical film 221 is attached to the outermost side of the upper display panel 200.

The optical films 121 and 221 are not the polarizer, and various optical films may be used. For example, a protective film and a coating film for protecting the upper display panel 200 or the lower display panel 100, an anti-fringe film preventing foreign particles, an anti-reflection or anti-glare film preventing a display quality from being deteriorated by reflecting external light, or the like may be used.

Moreover, the light blocking layer 233 and the light transmission layer 232 included in the fluorescent body unit 230 may be removed from the fluorescent body unit 230, and may be formed at the positions of the optical films 121 and 221. That is, the fluorescent body unit 230 may include only the fluorescent layer 231, the light transmission layer may be formed of the optical film 121 of the lower display panel 100, and the light blocking layer may be formed of the optical film 221 of the upper display panel 200.

Further, only one of the two optical films 121 and 221 according to the exemplary embodiment may be formed, and only the optical film 221 of the external side of the upper display panel 200 may be formed.

In the exemplary embodiment of FIG. 11, the upper reflective layer 211 and the lower reflective layer 111 have the structure conforming to the exemplary embodiment of FIG. 2 or 3.

Since FIG. 11 has the same microcavity structure as FIG. 1, the aforementioned liquid crystal display does not include the polarizer, thus improving light efficiency. Moreover, light efficiency is improved by using the fluorescent layer 231 instead of the color filter. Further, light is resonated in the space between the upper reflective layer 211 and the lower reflective layer 111 (microcavity) to allow light having a predetermined wavelength to be transmitted through the upper reflective layer 211. In this case, a transmission wavelength is changed by a change in refractive index of the liquid crystal layer, and the magnitude of transmitted light (transmittance) is changed according to a change in wavelength, such that it is possible to control a gray level.

Hereinafter, the exemplary embodiment of FIG. 12 will be described.

Figure 12:
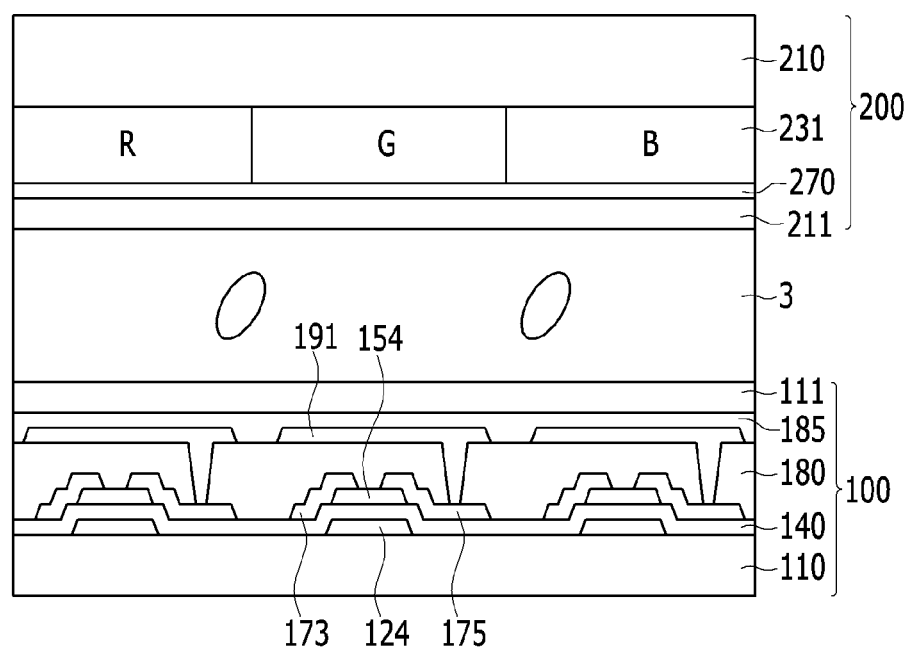
Figure 12:
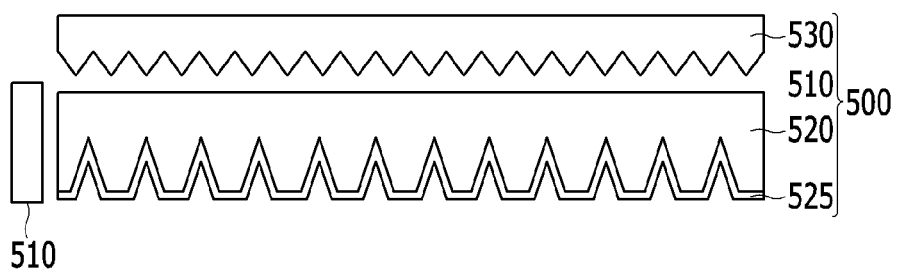

The exemplary embodiment of FIG. 12 has the structure where the light blocking layer 233 and the light transmission layer 232 are not included in the fluorescent body unit 230 unlike the exemplary embodiment of FIG. 1.

That is, as shown in FIG. 12, the liquid crystal display according to the exemplary embodiment of the present invention includes the lower display panel 100, the upper display panel 200, the liquid crystal layer 3 positioned therebetween, and the backlight unit 500.

The backlight unit 500 includes the light source 510, the light guide plate 520, the reflector 525, and the prism sheet 530. The lower display panel 100 positioned on the backlight unit 500 includes the thin film transistor (TFT), the pixel electrode 191, and the lower reflective layer 111 on the lower insulating substrate 110. The upper display panel 200 positioned on the lower display panel 100 includes the fluorescent body unit 230, the common electrode 270, and the upper reflective layer 211 on the upper insulating substrate 210. The lower display panel 100 and the upper display panel 200 do not include the polarizer. Herein, the fluorescent body unit 230 does not include the light blocking layer 233 and the light transmission layer 232.

The backlight unit 500 and the lower display panel 100 of the exemplary embodiment of FIG. 12 are not different from the backlight unit 500 and the lower display panel 100 of FIG. 1, thus, an additional description will be omitted.

The upper display panel 200 is similar to the exemplary embodiment of FIG. 1, but the fluorescent body unit 230 of the upper display panel 200 does not include the light blocking layer 233 and the light transmission layer 232.

In the exemplary embodiment of FIG. 12, the upper reflective layer 211 and the lower reflective layer 111 have the structure conforming to the exemplary embodiment of FIG. 2 or 3.

Since FIG. 12 has the same microcavity structure as FIG. 1, the aforementioned liquid crystal display does not include the polarizer, thus improving light efficiency. Moreover, light efficiency is improved by using the fluorescent layer instead of the color filter. Further, light is resonated in the space between the upper reflective layer 211 and the lower reflective layer 111 (microcavity) to allow light having a predetermined wavelength to be transmitted through the upper reflective layer 211. In this case, a transmission wavelength is changed by a change in refractive index of the liquid crystal layer, and the magnitude of transmitted light (transmittance) is changed according to a change in wavelength, such that it is possible to control a gray level. The light blocking layer 233 and the light transmission layer 232 in FIG. 12 may be formed at the positions of the optical films 121 and 221 shown in FIG. 11 or may be formed at other positions.

Hereinafter, the exemplary embodiment of FIG. 13 will be described.

Figure 13:
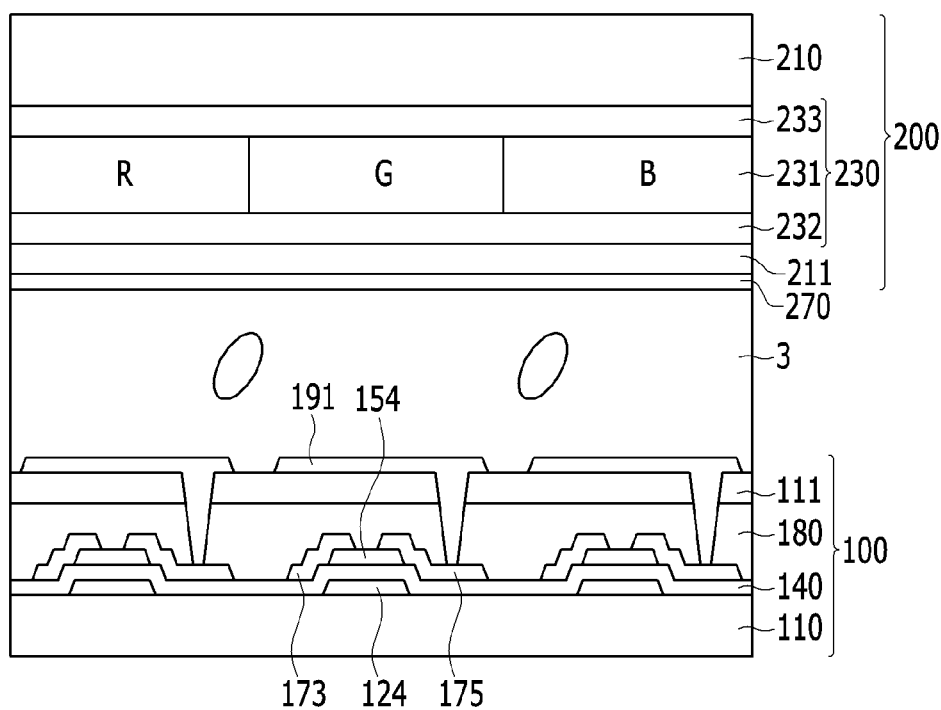
Figure 13:
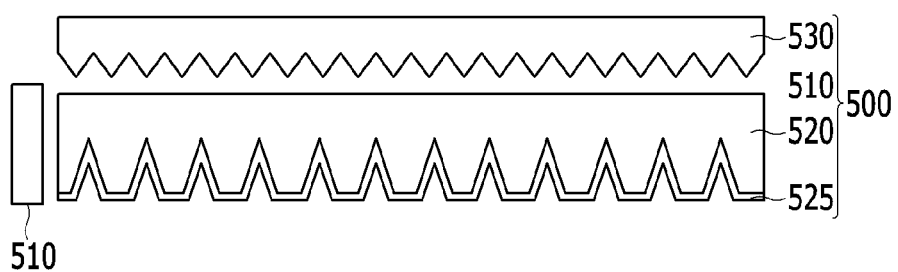

The exemplary embodiment of FIG. 13 has the structure where the upper reflective layer 211 is positioned on an upper side of the common electrode 270 and the lower reflective layer 111 is positioned on a lower side of the pixel electrode 191 unlike the exemplary embodiment of FIG. 1.

As shown in FIG. 13, the liquid crystal display according to the exemplary embodiment of the present invention includes the lower display panel 100, the upper display panel 200, the liquid crystal layer 3 positioned therebetween, and the backlight unit 500.

The backlight unit 500 includes the light source 510, the light guide plate 520, the reflector 525, and the prism sheet 530. The lower display panel 100 positioned on the backlight unit 500 includes the thin film transistor (TFT), the pixel electrode 191, and the lower reflective layer 111 on the lower insulating substrate 110. The upper display panel 200 positioned on the lower display panel 100 includes the fluorescent body unit 230, the common electrode 270, and the upper reflective layer 211 on the upper insulating substrate 210. The lower display panel 100 and the upper display panel 200 do not include the polarizer.

The backlight unit 500 of the exemplary embodiment of FIG. 13 is not different from the backlight unit 500 of FIG. 1, thus, an additional description will be omitted.

The lower display panel 100 will be described.

The gate line (not shown) including the gate electrode 124 is formed on the lower insulating substrate 110, and the gate line is covered with the gate insulating layer 140.

The semiconductor 154 is formed on the gate insulating layer 140, and the data conductor partially covering the semiconductor 154 and including the source electrode 173, the drain electrode 175, and the data line (not shown) is formed. The data conductor is covered with the first passivation layer 180, and the drain electrode 175 of the data conductor is exposed through the contact hole formed in the first passivation layer 180.

The gate electrode 124, the semiconductor 154, the source electrode 173, and the drain electrode 175 form the thin film transistor (TFT), and the channel of the thin film transistor (TFT) is formed in the semiconductor 154. The gate electrode 124 may be the control terminal of the thin film transistor (TFT), the source electrode 173 may be the input terminal of the thin film transistor (TFT), and the drain electrode 175 may be the output terminal of the thin film transistor (TFT).

The first passivation layer 180 is formed of the insulating material including the inorganic material or the organic material.

The lower reflective layer 111 is formed on the first passivation layer 180. The lower reflective layer 111 may have the structure including the multi-layered dielectric material or further including the metal layer in addition to the multi-layered dielectric material. (See FIGS. 2 and 3)

The contact hole through which the drain electrode 175 is exposed is formed in the first passivation layer 180 and the lower reflective layer 111.

The pixel electrode 191 formed of the transparent conductive material such as ITO or IZO is formed on the lower reflective layer 111, and electrically connected to the drain electrode 175 exposed through the contact hole.

The control terminal of the thin film transistor (TFT) is connected to the gate line, and the input terminal is connected to the data line. The output terminal of the thin film transistor (TFT) is connected to the pixel electrode 191.

The gate insulating layer 140 is formed between the gate line and the data line to be insulated from each other and cross each other.

The alignment layer (not shown) may be formed on the pixel electrode 191.

As described above, the polarizer is not attached to the lower display panel 100.

Hereinafter, the upper display panel 200 will be described.

The fluorescent body unit 230 is formed under the upper insulating substrate 210. The fluorescent body unit 230 includes the fluorescent layer 231, the light blocking layer 233 positioned on the upper portion of the fluorescent layer 231, and the light transmission layer 232 positioned on the lower portion of the fluorescent layer 231. The light blocking layer 233 blocks light having a wavelength band at which the fluorescent layer 231 is excited in order to prevent excitation of the fluorescent layer 231 by light provided from the outside, and the light transmission layer 232 allows light having the wavelength band at which the fluorescent layer 231 is excited to be transmitted therethrough. In the case where the light source 510 provides ultraviolet rays, the light blocking layer 233 is the ultraviolet rays blocking layer and the light transmission layer 232 is the ultraviolet rays transmission layer, and in the case where the light source 510 provides blue light, the light blocking layer 233 is the blue light blocking layer and the light transmission layer 232 is the blue light transmission layer. The light transmission layer 232 is positioned on the fluorescent layer 231 facing the backlight unit 500, and the light blocking layer 233 is positioned on the fluorescent layer 231 away from the backlight unit 500. At least one of the light transmission layer 232 and the light blocking layer 233 may be removed according to the exemplary embodiment.

The upper reflective layer 211 is formed under the fluorescent body unit 230. The upper reflective layer 211 may have the structure including the multi-layered dielectric material or further including the metal layer in addition to the multi-layered dielectric material, and may be identical to the lower reflective layer 111. (See FIGS. 2 and 3)

The common electrode 270 is formed under the upper reflective layer 211, and the common electrode 270 is formed of the transparent conductive material such as ITO or IZO.

The alignment layer (not shown) may be formed under the common electrode 270.

As described above, the polarizer is not attached to the upper display panel 200.

The liquid crystal layer 3 including liquid crystal molecules is positioned between the upper display panel 200 and the lower display panel 100. The liquid crystal layer 3 may be the vertical alignment (VA) mode, the horizontal alignment mode, or TN mode.

The aforementioned upper reflective layer 211 and lower reflective layer 111 may have the structure of FIG. 2 or 3. However, the lower reflective layer 111 of the exemplary embodiment of FIG. 13 includes the contact hole.

The liquid crystal display of FIG. 13 does not include the polarizer, thus improving light efficiency. Moreover, light efficiency is improved by using the fluorescent layer instead of the color filter. Further, light is resonated in the space between the upper reflective layer 211 and the lower reflective layer 111 (microcavity) to allow light having a predetermined wavelength to be transmitted through the upper reflective layer 211. The exemplary embodiment of FIG. 13 may change the refractive index N of the liquid crystal layer 3 even by the low voltage as compared to the exemplary embodiment of FIG. 1. Even though the upper reflective layer 211 and the lower reflective layer 111 include a metal film in the upper refractive layer 211 and the lower refractive layer 111, an electric field generated between the pixel electrode 191 and the common electrode 270 is not affected by the metal.

In the exemplary embodiment of FIG. 13, a transmission wavelength is changed by a change in refractive index of the liquid crystal layer 3, and the magnitude of transmitted light (transmittance) is changed according to a change in wavelength, such that it is possible to control a gray level.

Hereinafter, the exemplary embodiment of FIG. 14 will be described.

In the exemplary embodiment of FIG. 14, the lower reflective layer 111 is positioned below the thin film transistor (TFT) unlike the exemplary embodiment of FIG. 1. Meanwhile, the upper reflective layer 211 is positioned on the upper side of the common electrode 270 unlike the exemplary embodiment of FIG. 1.

Figure 14:
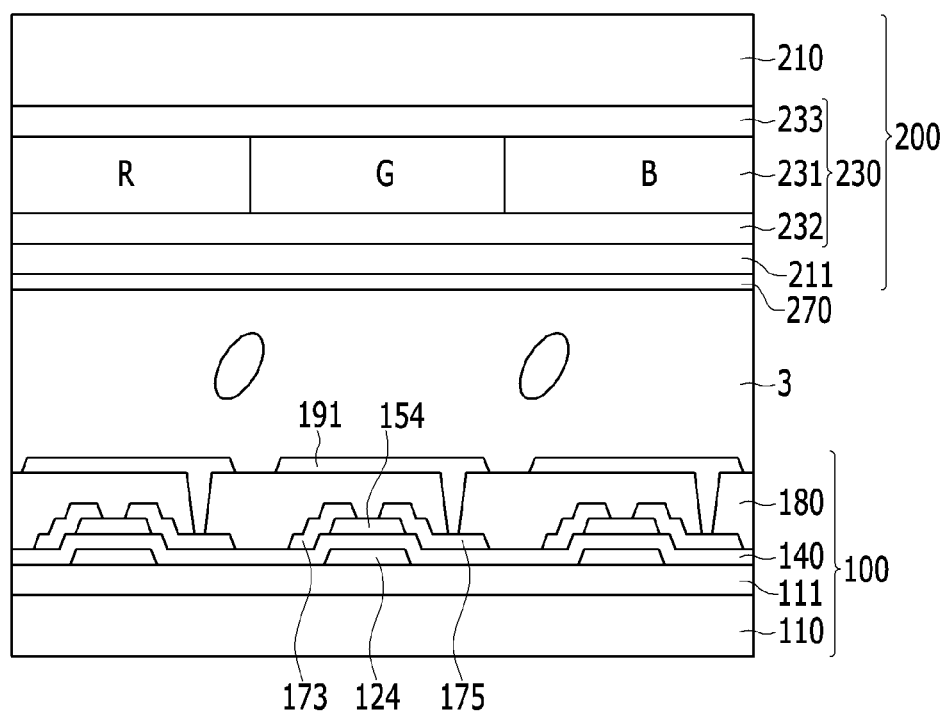
Figure 14:
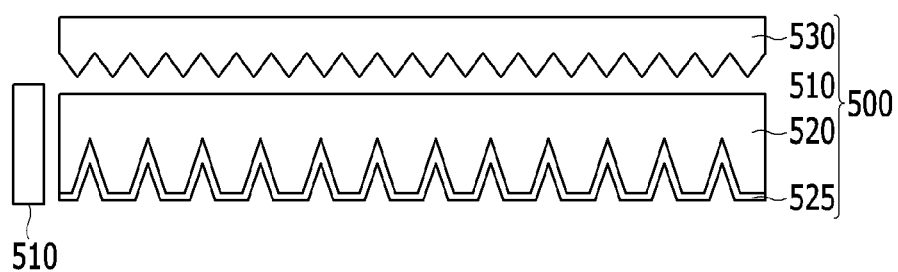

As shown in FIG. 14, the liquid crystal display according to the exemplary embodiment of the present invention includes the lower display panel 100, the upper display panel 200, the liquid crystal layer 3 positioned therebetween, and the backlight unit 500.

The backlight unit 500 includes the light source 510, the light guide plate 520, the reflector 525, and the prism sheet 530. The lower display panel 100 positioned on the backlight unit 500 includes the thin film transistor (TFT), the pixel electrode 191, and the lower reflective layer 111 on the lower insulating substrate 110. The upper display panel 200 positioned on the lower display panel 100 includes the fluorescent body unit 230, the common electrode 270, and the upper reflective layer 211 on the upper insulating substrate 210. The lower display panel 100 and the upper display panel 200 do not include the polarizer.

The backlight unit 500 of the exemplary embodiment of FIG. 14 is not different from the backlight unit 500 of FIG. 1, thus, an additional description will be omitted.

The lower display panel 100 will be described.

The lower reflective layer 111 is formed on the lower insulating substrate 110. The lower reflective layer 111 may have the structure including the multi-layered dielectric material or further including the metal layer in addition to the multi-layered dielectric material. (See FIGS. 2 and 3)

The gate line (not shown) including the gate electrode 124 is formed on the lower reflective layer 111, and the gate line is covered with the gate insulating layer 140.

The semiconductor 154 is formed on the gate insulating layer 140, and the data conductor partially covering the semiconductor 154 and including the source electrode 173, the drain electrode 175, and the data line (not shown) is formed. The data conductor is covered with the first passivation layer 180, and the drain electrode 175 of the data conductor is exposed through the contact hole formed in the first passivation layer 180.

The gate electrode 124, the semiconductor 154, the source electrode 173, and the drain electrode 175 form the thin film transistor (TFT), and the channel of the thin film transistor (TFT) is formed in the semiconductor 154. The gate electrode 124 may be the control terminal of the thin film transistor (TFT), the source electrode 173 may be the input terminal of the thin film transistor (TFT), and the drain electrode 175 may be the output terminal of the thin film transistor (TFT).

The first passivation layer 180 is formed of the insulating material including the inorganic material or the organic material.

The pixel electrode 191 formed of the transparent conductive material such as ITO or IZO is formed on the first passivation layer 180, and electrically connected to the drain electrode 175 exposed through the contact hole.

The control terminal of the thin film transistor (TFT) is connected to the gate line, and the input terminal is connected to the data line. The output terminal of the thin film transistor (TFT) is connected to the pixel electrode 191.

The gate insulating layer 140 is formed between the gate line and the data line to be insulated from each other and cross each other.

The alignment layer (not shown) may be formed on the pixel electrode 191.

As described above, the polarizer is not attached to the lower display panel 100.

Hereinafter, the upper display panel 200 will be described.

The fluorescent body unit 230 is formed under the upper insulating substrate 210. The fluorescent body unit 230 includes the fluorescent layer 231, the light blocking layer 233 positioned on the upper portion of the fluorescent layer 231, and the light transmission layer 232 positioned on the lower portion of the fluorescent layer 231. The light blocking layer 233 blocks light having a wavelength band at which the fluorescent layer 231 is excited in order to prevent excitation of the fluorescent layer 231 by light provided from the outside, and the light transmission layer 232 allows light having the wavelength band at which the fluorescent layer 231 is excited to be transmitted therethrough. In the case where the light source 510 provides ultraviolet rays, the light blocking layer 233 is the ultraviolet rays blocking layer and the light transmission layer 232 is the ultraviolet rays transmission layer. In the case where the light source 510 provides blue light, the light blocking layer 233 is the blue light blocking layer and the light transmission layer 232 is the blue light transmission layer. The light transmission layer 232 is positioned on the fluorescent layer 231 facing the backlight unit 500, and the light blocking layer 233 is positioned on the fluorescent layer 231 away from the backlight unit 500. At least one of the light transmission layer 232 and the light blocking layer 233 may be removed according to the exemplary embodiment.

The upper reflective layer 211 is formed under the fluorescent body unit 230. The upper reflective layer 211 may have the structure including the multi-layered dielectric material or further including the metal layer in addition to the multi-layered dielectric material, and may be identically formed with regard to the lower reflective layer 111. (See FIGS. 2 and 3)

The common electrode 270 is formed under the upper reflective layer 211, and the common electrode 270 is formed of the transparent conductive material such as ITO or IZO.

The alignment layer (not shown) may be formed under the common electrode 270.

As described above, the polarizer is not attached to the upper display panel 200.

The liquid crystal layer 3 including liquid crystal molecules is positioned between the upper display panel 200 and the lower display panel 100. The liquid crystal layer 3 may be the vertical alignment (VA) mode, the horizontal alignment mode, or TN mode.

The aforementioned upper reflective layer 211 and lower reflective layer 111 may have the structure of FIG. 2 or 3.

The liquid crystal display of FIG. 14 does not include the polarizer, thus improving light efficiency. Moreover, light efficiency is improved by using the fluorescent layer 231 instead of the color filter. Further, light is resonated in the space (microcavity) between the upper reflective layer 211 and the lower reflective layer 111 to allow light having a predetermined wavelength to be transmitted through the upper reflective layer 211 and emitted. However, the common electrode 270, the pixel electrode 191, and the thin film transistor are present in the space (microcavity) between the upper reflective layer 211 and the lower reflective layer 111 to relatively deteriorate the resonance characteristic as compared to the exemplary embodiment of FIG. 1. However, the exemplary embodiment of FIG. 14 may change the refractive index N of the liquid crystal layer 3 even by the low voltage as compared to the exemplary embodiment of FIG. 1. Further, even though the upper reflective layer 211 and the lower reflective layer 111 include metal, there is a merit in that an effect is less applied to the electric field generated between the pixel electrode 191 and the common electrode 270.

In the exemplary embodiment of FIG. 14, a transmission wavelength is changed by a change in refractive index of the liquid crystal layer 3, and the magnitude of transmitted light (transmittance) is changed according to a change in wavelength, such that it is possible to control a gray level.

Hereinafter, characteristics of light in the exemplary embodiments of FIGS. 1, 7, and 10 to 14 will be described through FIGS. 15 to 18.

FIGS. 15 to 18 are graphs showing a characteristic of the exemplary embodiment of the present invention.

First, characteristics of the exemplary embodiments of FIGS. 1, 7, and 11 to 14 including the liquid crystal layer microcavity, and the exemplary embodiment further having the dielectric material microcavity will be described through FIGS. 15 and 16.

Figure 15:
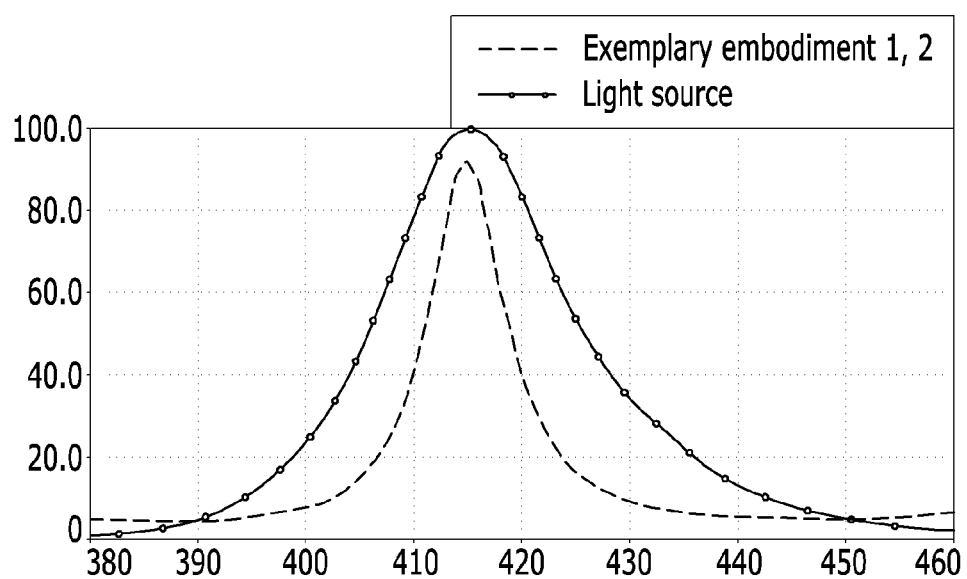
FIGS. 15 to 18 are graphs showing a characteristic of the exemplary embodiment of the present invention.

First, FIG. 15 shows comparison of the characteristic (luminance according to the wavelength) of light transmitted through the liquid crystal layer microcavity and the characteristic (luminance according to the wavelength) of the light source in exemplary embodiments 1 and 2 (the exemplary embodiments of FIGS. 1 and 7) including only the liquid crystal layer microcavity. The upper and the lower reflective layers 211 and 111 used in FIG. 15 have the same structure as FIG. 2, the high refractive index layer is formed by using $TiO_2$ in a thickness of 45 nm, and the low refractive index layer is formed by using $SiO_2$ in a thickness of 77 nm. The alignment layer is formed on the internal sides of the upper reflective layer 211 and the lower reflective layer 111, and the alignment layer is formed of polyimide in a thickness of 100 nm. Further, the thickness of the cell gap of the liquid crystal layer 3 is 480 nm, and liquid crystal having the birefringence Δn of the liquid crystal layer of 0.2 is used. The result of simulation under this condition is shown in FIG. 15.

Figure 16:
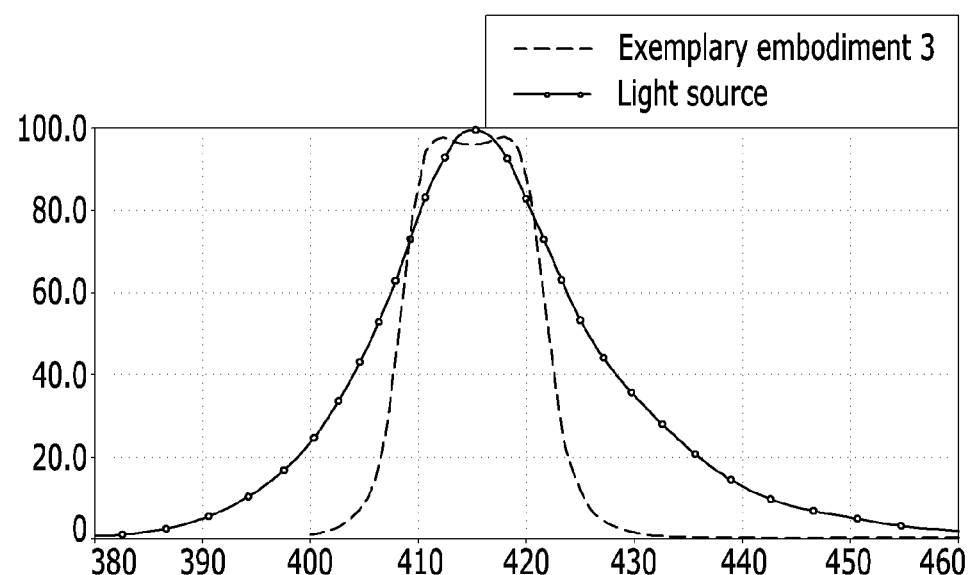

Meanwhile, FIG. 16 shows comparison of the characteristic (luminance according to the wavelength) of light transmitted through the liquid crystal layer microcavity and the dielectric material microcavity and the characteristic (luminance according to the wavelength) of the light source in the case where the dielectric material microcavity is further provided like FIG. 10 (third exemplary embodiment). The first upper, the second upper, the first lower, and the second lower reflective layers 211, 212, 111, and 112 used in FIG. 16 have the same structure as FIG. 2, the high refractive index layer is formed by using $TiO_2$ in a thickness of 44 nm, and the low refractive index layer is formed by using $SiO_2$ in a thickness of 72 nm. The dielectric layer is positioned between the first upper reflective layer 211 and the second upper reflective layer 212 and between the first lower reflective layer 111 and the second lower reflective layer 112, and the reflective layers are formed by disposing the low refractive index layer and the high refractive index layer instead of the dielectric layer. That is, in the case where the high refractive index layer is H, the low refractive index layer is L, and the liquid crystal layer is LC, the relationship between the layers is as follows.

H L H 2L H L H L <u>HLHLCHLH</u> L H L H 2L H L H

Herein, 2L represents the low refractive index layer that is a layer two times as thick as another refractive index layer.

Herein, the bold letters represent the first upper reflective layer 211, the liquid crystal layer 3, and the first lower reflective layer 111. The structures illustrated outside the bold letters represent the second reflective layer and the dielectric layer. The second upper reflective layer and the upper dielectric layer, and the second lower reflective layer and the lower dielectric layer have a symmetric structure.

In the case where the structure of H L H is considered as the unit laminate structure, the structure of the outermost side may be considered as the second upper reflective layer and the second lower reflective layer, and all the remaining layers interposed therebetween may be considered as the dielectric layer. This case corresponds to the exemplary embodiment of FIG. 10.

Meanwhile, in the case where the layer having the H L H structure is considered as an additional reflective layer, the above structure may be considered to have two additional upper reflective layers and two additional lower reflective layers. In this case, the layers between the reflective layers are considered to be two dielectric layers, 2L and L, respectively. This case corresponds to the structure where total three reflective layers and two dielectric layers are positioned on one display panel. Two or more reflective layers may be formed on the display panel.

Further, the thickness of the cell gap of the liquid crystal layer 3 is 730 nm, and liquid crystal having the birefringence Δn of the liquid crystal layer of 0.2 is used. The result of simulation under this condition is shown in FIG. 16.

FIG. 15 shows the luminance has a peak when the wave length is around 415 nanometers. On the contrary, the luminance of FIG. 16 which include dielectric material microcavity has a peak value in a wide wavelength range. That is, in the case where only one liquid crystal layer microcavity is included, light having specific wave length is emitted from the microcavity. In the case where the dielectric material microcavity is further included, lights having a broad range of wavelengths are emitted from the micro cavity due to the characteristic of the dielectric material microcavity.

Nevertheless, in all the exemplary embodiments, since luminance of transmitted light may be adjusted by adjusting the refractive index N of the liquid crystal layer 3, it is possible to control a gray level.

Figure 17:
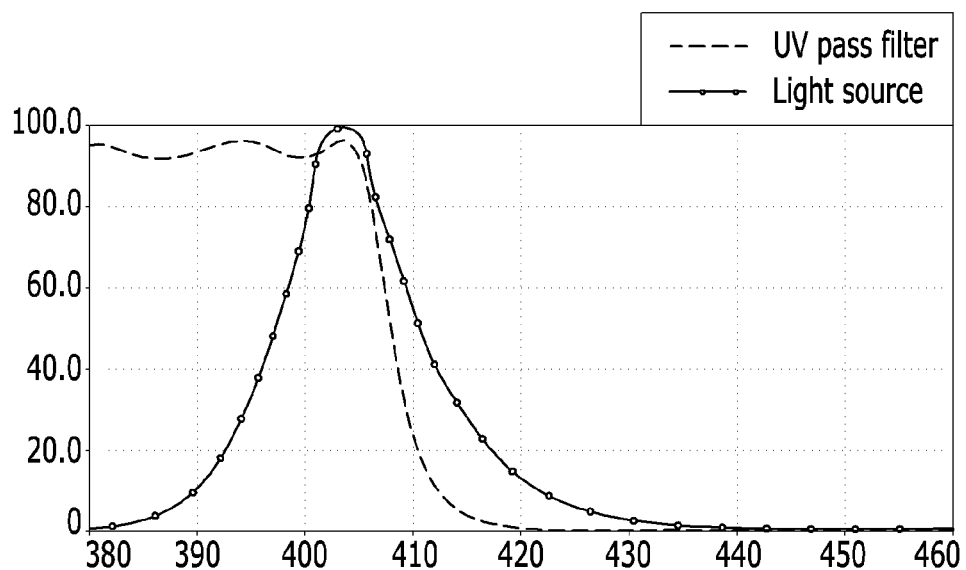
Figure 18:
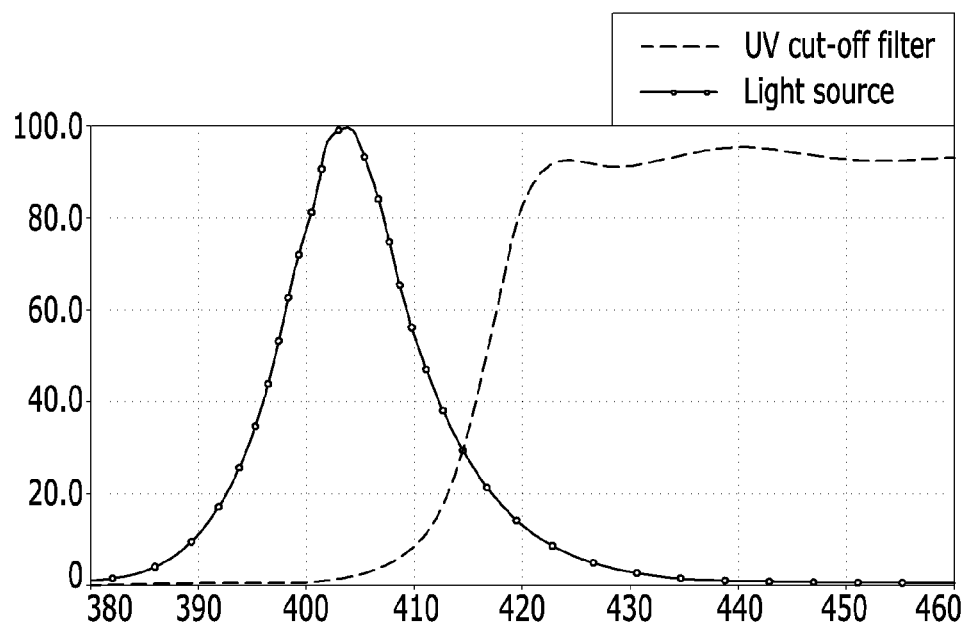

FIGS. 17 and 18 show blocking and transmission characteristics of the light blocking layer 233 and the light transmission layer 232 included in the fluorescent body unit 230.

First, FIG. 17 shows a characteristic of an ultraviolet rays transmission filter as the transmission characteristic of the light transmission layer 232.

Meanwhile, FIG. 18 shows a characteristic of an ultraviolet rays blocking filter as the transmission characteristic of the light blocking layer 233.

The light blocking layer 233 blocks ultra violet rays incident on the fluorescent layer 231 by light provided from the outside, and the light transmission layer 232 selectively pass the ultra violet rays emitted from the microcavity.

However, the light transmission layer 232 and the light blocking layer 233 may be omitted according to the exemplary embodiment.

The aforementioned exemplary embodiments describe that the refractive index N of the liquid crystal layer 3 is changed by the electric field generated by the pixel electrode 191 and the common electrode 270, the pixel electrode 191 is positioned in the lower display panel 100, and the common electrode 270 is positioned in the upper display panel 200. However, the pixel electrode 191 may be positioned in the same display panel as the common electrode 270, the pixel electrode 191 may be positioned in the upper display panel 200, and the common electrode 270 may be positioned in the lower display panel 100 according to the exemplary embodiment. The pixel electrode 191 and the common electrode 270 are called a pair of field generating electrodes, and are formed in at least one of the upper display panel 200 and the lower display panel 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a lower display panel comprising a lower insulating substrate and a lower reflective layer;
an upper display panel comprising an upper insulating substrate and an upper reflective layer;
a liquid crystal layer positioned between the lower reflective layer of the lower display panel and the upper reflective layer of the upper display panel; and
a backlight unit positioned on a lower portion of the lower display panel and comprising a light source,
wherein a pair of field generating electrodes are formed in at least one display panel of the lower display panel and the upper display panel,
wherein microcavities are formed in the lower reflective layer, the upper reflective layer, and the liquid crystal layer, and
wherein a wavelength or luminance of light resonated and emitted in the microcavities is changed by an electric field generated by the field generating electrodes.

2. The liquid crystal display of claim 1, wherein:
a gray is displayed by adjusting a voltage applied to the field generating electrodes to change the electric field, thus changing the luminance of light emitted in the microcavities.

3. The liquid crystal display of claim 2, wherein:
the upper reflective layer and the lower reflective layer comprise a unit laminate structure where a high refractive index layer and a low refractive index layer are repeatedly laminated.

4. The liquid crystal display of claim 3, wherein:
the unit laminate structure has a triple layer structure where two upper and lower high refractive index layers are formed and the low refractive index layer is positioned therebetween.

5. The liquid crystal display of claim 3, wherein:
one of the upper reflective layer and the lower reflective layer comprises at least two unit laminate structure and a metal layer interposed therebetween.

6. The liquid crystal display of claim 3, wherein:
the upper display panel further comprises a fluorescent body unit comprising a fluorescent layer.

7. The liquid crystal display of claim 6, wherein:
the fluorescent layer is excited by light having a predetermined wavelength provided from the light source to display a color.

8. The liquid crystal display of claim 6, wherein:
the fluorescent body unit further comprises a light transmission layer positioned under the fluorescent layer and allowing light having the predetermined wavelength to be transmitted therethrough.

9. The liquid crystal display of claim 6, wherein:
the fluorescent body unit further comprises a light blocking layer positioned on the fluorescent layer and blocking light having the predetermined wavelength.

10. The liquid crystal display of claim 6, wherein:
the fluorescent body unit is positioned between the upper insulating substrate and the upper reflective layer.

11. The liquid crystal display of claim 6, wherein:
the fluorescent body unit is positioned at an external side of the upper insulating substrate.

12. The liquid crystal display of claim 3, wherein:
the field generating electrodes comprise the common electrode formed in the upper display panel and the pixel electrode formed in the lower display panel,
the common electrode is positioned on the upper reflective layer, and
the pixel electrode is positioned under the lower reflective layer.

13. The liquid crystal display of claim 3, wherein:
the field generating electrodes comprise the common electrode formed in the upper display panel and the pixel electrode formed in the lower display panel,
the common electrode is positioned under the upper reflective layer, and
the pixel electrode is positioned on the lower reflective layer.

14. The liquid crystal display of claim 3, wherein:
the lower display panel further comprises a second lower reflective layer positioned on a lower portion of the lower reflective layer, and
the upper display panel further comprises a second upper reflective layer positioned on an upper portion of the upper reflective layer.

15. The liquid crystal display of claim 14, further comprising:
a lower dielectric layer positioned between the lower reflective layer and the second lower reflective layer; and
an upper dielectric layer positioned between the upper reflective layer and the second upper reflective layer.

16. The liquid crystal display of claim 3, further comprising:
an optical film attached to an outermost side of the upper display panel or a lowermost side of the lower display panel,
wherein the optical film is not a polarizer.

17. The liquid crystal display of claim 3, wherein:
the backlight unit further comprises a light guide plate and a reflective sheet transferring light provided from the light source to the lower display panel.

18. The liquid crystal display of claim 17, wherein:
a protrusion pattern is formed on a lower surface of the light guide plate.

19. The liquid crystal display of claim 17, further comprising:
a prism sheet having a prism pattern on an upper portion of the light guide plate.

20. The liquid crystal display of claim 3, wherein:
the light source provides ultraviolet rays or blue light.

* * * * *